US008612057B2

(12) United States Patent
Murata et al.

(10) Patent No.: US 8,612,057 B2
(45) Date of Patent: Dec. 17, 2013

(54) CONTROL OF WATER DISCHARGE SYSTEM BY REFLECTED WAVE DETECTION THRESHOLD(S)

(75) Inventors: Kensuke Murata, Fukuoka-ken (JP); Masayuki Nagaishi, Fukuoka-ken (JP); Katsuhisa Tsuchiya, Fukuoka-ken (JP); Shoichi Tsuiki, Fukuoka-ken (JP); Masami Tsujita, Fukuoka-ken (JP); Hiroshi Tsuboi, Fukuoka-ken (JP)

(73) Assignee: Toto Ltd., Fukuoka (JP)

( * ) Notice: Subject to any disclaimer, the term of this patent is extended or adjusted under 35 U.S.C. 154(b) by 577 days.

(21) Appl. No.: 12/809,251

(22) PCT Filed: Dec. 17, 2008

(86) PCT No.: PCT/JP2008/003806
§ 371 (c)(1),
(2), (4) Date: Sep. 22, 2010

(87) PCT Pub. No.: WO2009/081544
PCT Pub. Date: Jul. 2, 2009

(65) Prior Publication Data
US 2011/0000559 A1  Jan. 6, 2011

(30) Foreign Application Priority Data
Dec. 21, 2007  (JP) .................. 2007-331078

(51) Int. Cl.
*G05D 7/00* (2006.01)
*E03C 1/05* (2006.01)
*F16K 31/02* (2006.01)

(52) U.S. Cl.
CPC ........................ *E03C 1/05* (2013.01)
USPC ................. 700/282; 4/623; 251/129.04

(58) Field of Classification Search
CPC ........................................... E03C 1/05
USPC ........ 700/282; 4/313; 137/1, 601.14, 624, 11, 137/624.12; 236/12.12; 342/27, 28; 251/129.04
See application file for complete search history.

(56) References Cited

U.S. PATENT DOCUMENTS 4,981,158 A * 1/1991 Brondolino et al. ...... 137/624.11
5,566,702 A * 10/1996 Philipp ............................ 137/1

(Continued)

FOREIGN PATENT DOCUMENTS

DE    3408261 A1    9/1995
DE    19712222 A1   10/1997

(Continued)

OTHER PUBLICATIONS

Machine Translation of Murase Y et al. JP 2006193954 A "Automatic water discharge control apparatus for washstand has control unit judges start or stop of water discharge according to detecting signal based on first beam or second beam of radio wave."*

(Continued)

*Primary Examiner* — Dave Robertson
(74) *Attorney, Agent, or Firm* — Pearne & Gordon LLP

(57) ABSTRACT

A water discharge system capable of preventing a mistaken detection to surely perform the stop of water discharge or continue the start of water discharge is provided. The water discharge system includes: a water discharge unit; a sensor unit configured to obtain information about an object to be detected through a reflected wave of a radiated radio wave; a control unit configured to control the start of water discharge from the water discharge unit based on a detective signal from the sensor unit; and a storage mechanics. The sensor unit is installed so that at least part of a radiated radio wave comes into contact with a discharged water flow discharged from the water discharge unit and receives the reflected wave reflected by the discharged water flow, and the control unit determines a state of the discharged water flow by checking a relationship between a first threshold set larger than amplitude of oscillation around a reference value of the detective signal in a water flow state in which only the start of water discharge from the water discharge unit is performed and amplitude of the detective signal received by the sensor unit.

29 Claims, 24 Drawing Sheets

(56) References Cited

U.S. PATENT DOCUMENTS

| | | | |
|---|---|---|---|
| 5,694,653 A * | 12/1997 | Harald | 4/623 |
| 5,829,072 A * | 11/1998 | Hirsch et al. | 4/605 |
| 6,067,673 A | 5/2000 | Paese | |
| 6,388,609 B2 * | 5/2002 | Paese et al. | 342/27 |
| 7,537,195 B2 * | 5/2009 | McDaniel et al. | 251/129.04 |
| 7,921,480 B2 * | 4/2011 | Parsons et al. | 4/313 |
| 8,104,113 B2 * | 1/2012 | Rodenbeck et al. | 4/623 |
| 8,171,578 B2 * | 5/2012 | Tsujita et al. | 4/623 |
| 8,276,878 B2 * | 10/2012 | Parsons et al. | 251/129.04 |

FOREIGN PATENT DOCUMENTS

| | | | | |
|---|---|---|---|---|
| FR | 2561049 A1 | 9/1985 | | |
| JP | 09-080150 A | 3/1997 | | |
| JP | 2002-159419 A | 6/2002 | | |
| JP | 2005-207012 A | 8/2005 | | |
| JP | 2006-193954 A | 7/2006 | | |
| JP | 2006283441 A * | 10/2006 | | E03C 1/05 |
| JP | 2007-241446 A | 9/2007 | | |
| WO | 99/04286 A1 | 1/1999 | | |

OTHER PUBLICATIONS

International Search Report for PCT/JP2008/003806 dated Mar. 24, 2009.

* cited by examiner

CONTROL OF WATER DISCHARGE SYSTEM BY REFLECTED WAVE DETECTION THRESHOLD(S)

TECHNICAL FIELD

An embodiment of the invention generally relates to a water discharge system, and more specifically relates to a water discharge system provided in a washroom, toilet, kitchen, and the like and controlling the stop of water discharge of a discharged water flow by using a radio wave sensor of a microwave and the like.

BACKGROUND ART

As a water discharge system that detects a human body to control the start of water discharge automatically, there is a water discharge system that uses a human body or a human hand as an object to be detected, detects the presence or absence of the object to be detected based on the intensity of the reflected radio wave from the object to be detected, and performs the stop of water discharge if the object to be detected is not detected.

When a transmission wave such as a microwave comes into contact with an object to be detected, a reflected wave or a transmitted wave is generated. The object to be detected such as a human body can be detected by receiving the reflected wave or the transmitted wave, and the water discharge system can be used for a faucet apparatus and the like.

JP-A 9-80150 (1997)(Kokai) discloses a human body detection system that receives the reflected wave of a radiated microwave from an human body, finds the power spectrum of the Doppler frequency signal of the reflected wave, and compares the peak value of the power spectrum and a prescribed threshold to detect the human body.
Patent Citation 1: JP-A 9-80150 (1997)

DISCLOSURE OF THE INVENTION

However, in the case of determining based on the reflected wave from an object to be detected (a human body or a human hand), there may be cases where, even if the hand is pulled out from the discharged water flow and the human body moves away from the faucet apparatus, only the discharged water flow is mistakenly detected as an object to be detected and the water discharge does not stop. Furthermore, if the reflection intensity from the human hand or the like becomes weak during the use of the discharged water, the stop of water discharge is performed undesirably.

The purpose of the invention is to provide a water discharge system capable of preventing a mistaken detection to surely perform the stop of water discharge or continue the start of water discharge.

According to an aspect of the invention, there is provided a water discharge system including: a water discharge unit; a sensor unit configured to obtain information about an object to be detected through a reflected wave of a radiated radio wave; a control unit configured to control the start of water discharge from the water discharge unit based on a detective signal from the sensor unit; and a storage mechanics, the sensor unit being installed so that at least part of a radiated radio wave comes into contact with a discharged water flow discharged from the water discharge unit and receives the reflected wave reflected by the discharged water flow, and the control unit determining a state of the discharged water flow by checking a relationship between a first threshold set larger than amplitude of oscillation around a reference value of the detective signal in a water flow state in which only the start of water discharge from the water discharge unit is performed and amplitude of the detective signal received by the sensor unit.

According to another aspect of the invention, there is provided a water discharge system including: a water discharge unit; a sensor unit configured to obtain information about an object to be detected through a reflected wave of a radiated radio wave; a control unit configured to control the start of water discharge from the water discharge unit based on a detective signal from the sensor unit; and a storage mechanics, the sensor unit being installed so that at least part of a radiated radio wave comes into contact with a discharged water flow discharged from the water discharge unit and receives the reflected wave reflected by the discharged water flow, and the control unit determining a state of the discharged water flow by checking a relationship between a second threshold set smaller than amplitude of oscillation around a reference value of the detective signal in a water flow state in which only the start of water discharge form the water discharge unit is performed and amplitude of the detective signal received by the sensor unit.

According to another aspect of the invention, there is provided a water discharge system including: a water discharge unit; a sensor unit configured to obtain information about an object to be detected through a reflected wave of a radiated radio wave; a control unit configured to control the start of water discharge from the water discharge unit based on a detective signal from the sensor unit; and a storage mechanics, the sensor unit being installed so that at least part of a radiated radio wave comes into contact with a discharged water flow discharged from the water discharge unit and receives the reflected wave reflected by the discharged water flow, and the control unit determining a state of the discharged water flow by checking a relationship between a first threshold set larger than amplitude of oscillation around a reference value of the detective signal in a water flow state in which only the start of water discharge from the water discharge unit is performed and a second threshold set smaller than the amplitude, and amplitude of the detective signal received by the sensor unit.

EXPLANATION OF REFERENCE 10 water supply hose, 30 spout, 40 water receiving unit, 100 sensor unit, 112, 112a, 112b antenna, 114 transmission unit, 116 reception unit, 118 mixer unit, 200 control unit, 210 filter, 220 frequency detection unit, 230 determination unit, 240 storage mechanics, 250 valve, 110 waveguide

BEST MODE OF CARRYING OUT THE INVENTION

According to the invention, a water discharge system capable of preventing a mistaken detection to surely perform the stop of water discharge or continue the start of water discharge can be provided.

Embodiments of the invention will now be described with reference to the drawings.

Figure 1A:
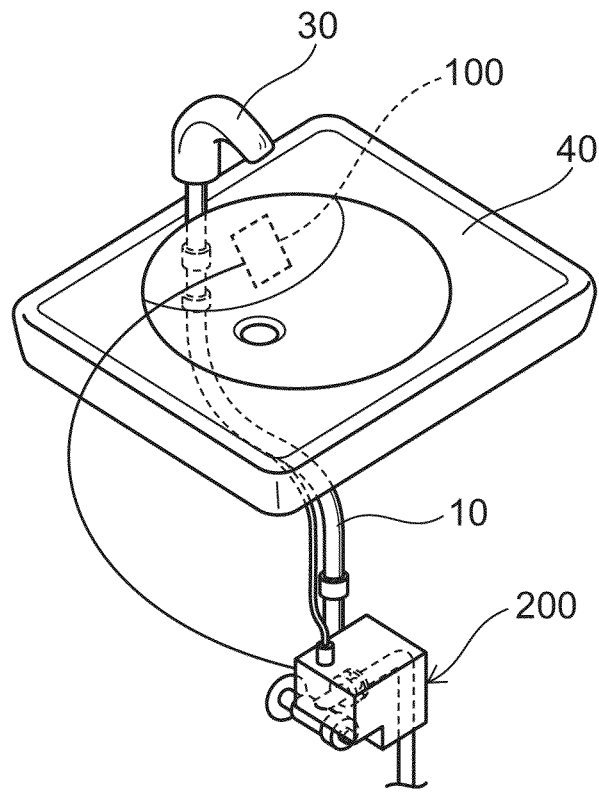
FIGS. 1A and 1B are views illustrating the configuration of a water discharge system of a first embodiment of the invention.
Figure 1B:
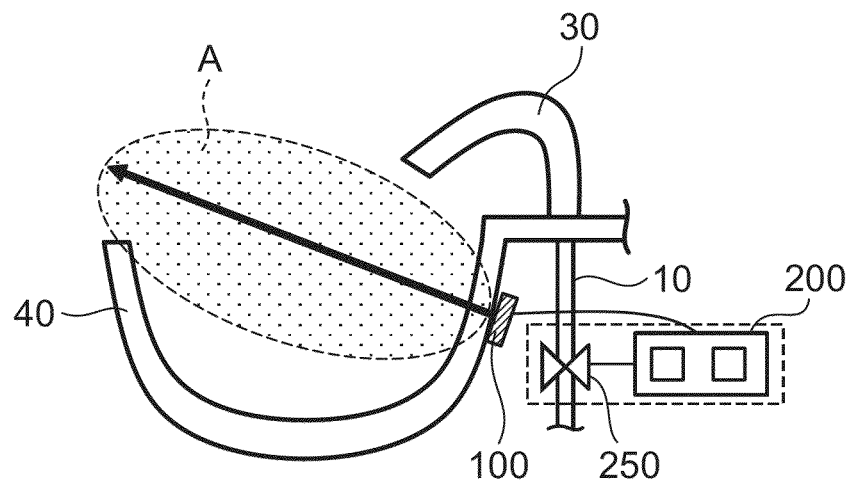

FIGS. 1A and 1B are views illustrating the configuration of a water discharge system of a first embodiment of the invention, where FIG. 1A is a top view and FIG. 1B is a side cross-sectional view. The water discharge system includes a sensor unit 100 and a control unit 200. In the case of the specific example illustrated in FIGS. 1A and 1B, the sensor unit 100 and the control unit 200 form a faucet apparatus along with a water supply hose 10, a spout 30, a water receiving unit 40 made of a ceramic material, and the like. In the following drawings, components similar to those described in regard to a drawing thereinabove are marked with the same reference numerals, and a detailed description is omitted.

The sensor unit 100 is a high frequency sensor that radiates (transmits) a high frequency radio wave such as a microwave or a milliwave, receives the reflected wave of the radiated radio wave from an object to be detected, detects the presence or absence and/or the state of the object to be detected, and outputs a detective signal.

Figure 2:
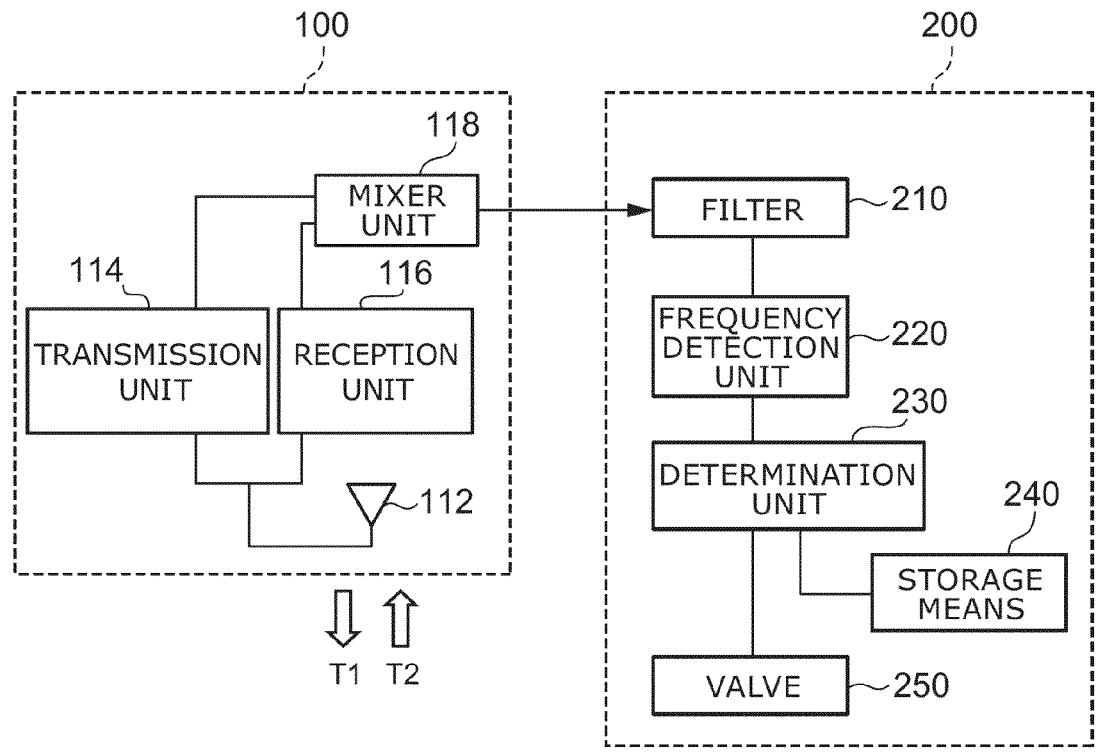
FIG. 2 is a block diagram of a specific example of the sensor unit 100 and the control unit 200.
Figure 3:
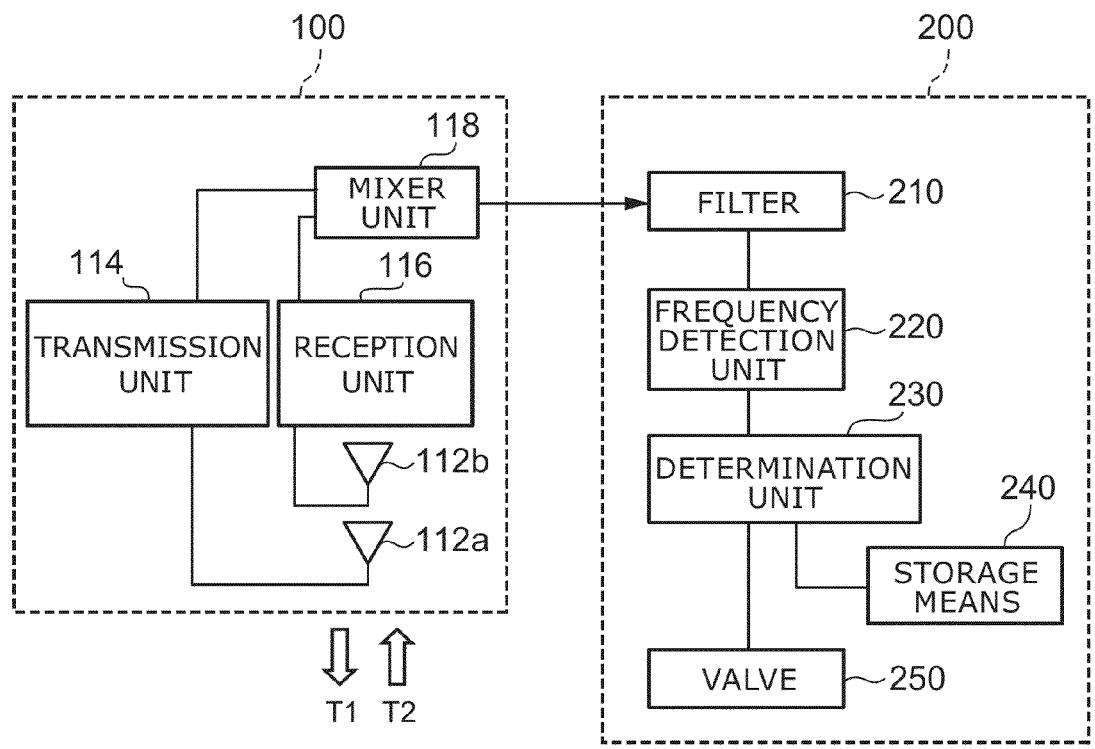
FIG. 3 is a block diagram of a specific example of the sensor unit 100 and the control unit 200.

FIG. 2 and FIG. 3 are block diagrams of two specific examples of the sensor unit 100 and the control unit 200.

The sensor unit 100 includes an antenna 112, a transmission unit 114, a reception unit 116, and a mixer unit 118. A radio wave in a frequency band of 10 kHz to 100 GHz such as a high-frequency wave, a microwave, or a milliwave is radiated from the antenna 112 connected to the transmission unit 114. Specifically, a transmission wave T1 having a frequency of, for example, 10.525 GHz is radiated from the antenna 112. A reflected wave or a transmitted wave T2 from an object to be detected such as a human body is inputted to the reception unit 116 via the antenna 112. Here, the antenna may be shared between the transmission side and the reception side as illustrated in FIG. 2. Alternatively, as illustrated in FIG. 3, a configuration is possible in which an antenna 112a is connected to the transmission unit 114, and an antenna 112b is connected to the reception unit 116.

Part of the transmission wave and the reception wave are inputted to the mixer unit 118 to be combined with each other, and an output signal in which the Doppler effect is reflected, for example, is outputted. The detective signal outputted from the mixer unit 118 is outputted to the control unit 200. The control unit 200 includes a filter 210, a frequency detection unit 220, a determination unit 230, a storage mechanics 240, and a valve 250. High frequency components are first removed from the detective signal outputted from the mixer unit 118 at the filter 210. The filtering frequency at this time may be 200 Hz, for example. As described later in detail, the filter 210 may not be provided in this embodiment.

The detective signal outputted from the mixer unit 118 has a wave form in which high frequency signals overlap with a low frequency base line. The high frequency components include information about the Doppler effect. That is, when the object to be detected such as a human body and water moves, the wavelength of the reflected wave shifts due to the Doppler effect. The Doppler frequency ΔF (Hz) may be illustrated by Formula (1) below:

$$\Delta F = Fs - Fb = 2 \times Fs \times v/c \qquad \text{Formula (1)}$$

where Fs: the transmission frequency (Hz)
Fb: the reflection frequency (Hz)
v: the velocity of an object (m/s)
c: the velocity of light (=300×106 m/s)

When the object to be detected moves relatively with the sensor unit 100, an output signal is obtained that includes a frequency ΔF in proportion to the velocity v of the object to be detected as illustrated in Formula (1). The output signal has a frequency spectrum, and there is a correlation between the peak frequency corresponding to the peak of the spectrum and the velocity v of the moving object. Therefore, the velocity v can be found by measuring the Doppler frequency ΔF. In Japan, frequencies of 10.50 to 10.55 GHz or 24.05 to 24.25 GHz may be used for the purpose of detecting a human body.

In this embodiment, the sensor unit 100 is installed at the water receiving unit 40 so that at least part of the radiated radio wave may come into contact with the discharged water flow from the spout 30. In other words, the sensor unit 100 is configured to be capable of irradiating the discharged water flow from the spout 30 with a radio wave and receiving the radio wave reflected by the discharged water flow.

On the other hand, the control unit 200 detects the disorder (or the state) of the discharged water flow discharged from the spout 30 based on the detective signal from the sensor unit 100, and stops the water discharge from the spout 30 when the disorder (or the state) of the discharged water flow becomes within a prescribed range. That is, the determination unit 230 compares a prescribed threshold stored in the storage mechanics 240 and the detective signal, and opens or closes the valve 250 based on the result of the comparison. The flow rate of the discharged water flow is made constant by a not-illustrated continuous flow valve.

Figure 4:
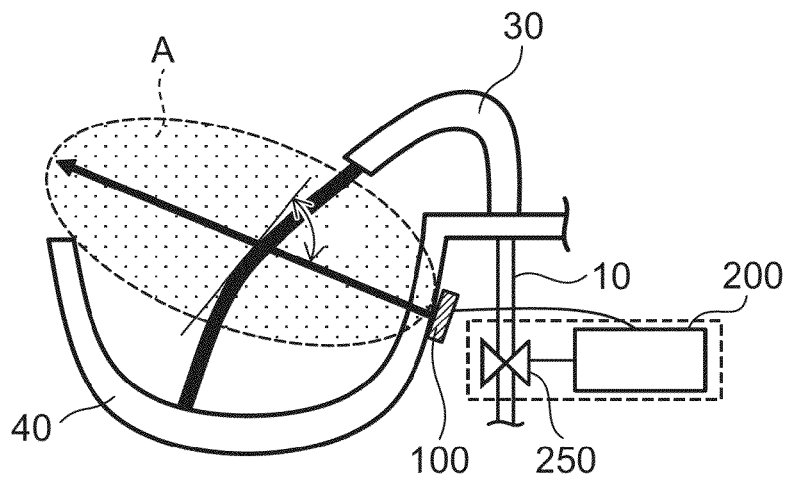
FIG. 4 is a schematic view describing the angle θ between the maximum orientation of the radio wave of the sensor unit 100 and the tangential direction of the discharged water flow in the first embodiment of the invention.

FIG. 4 is a schematic view describing the angle θ between the maximum orientation of the radio wave of the sensor unit 100 and the tangential direction of the discharged water flow.

Figure 5:
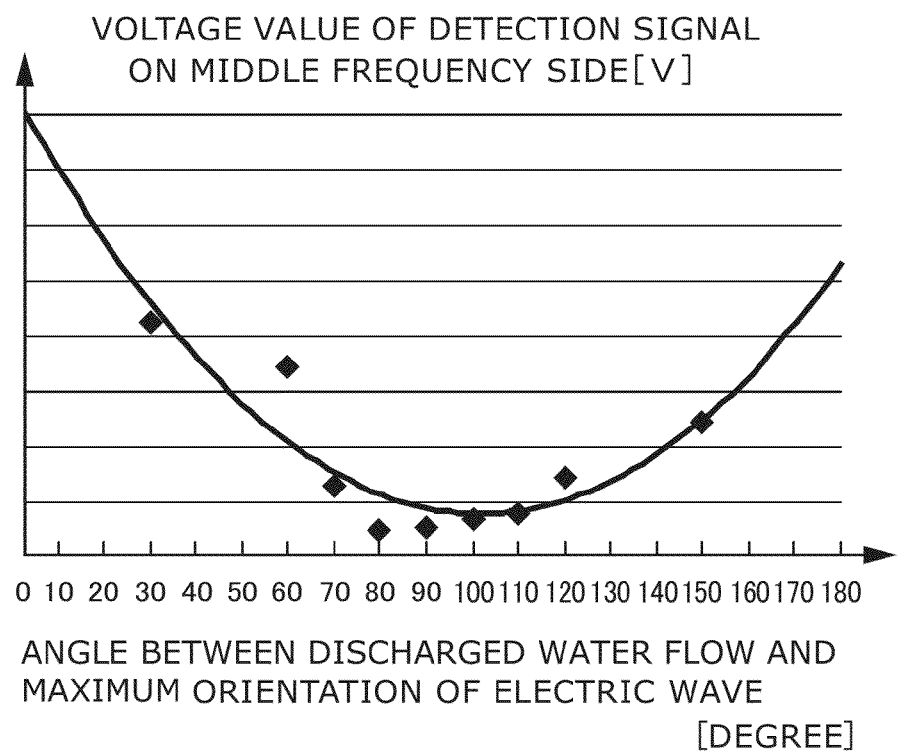
FIG. 5 is a graph illustrating the voltage characteristic of a middle frequency side component of the detective signal to the angle θ between the tangent to the discharged water flow and the maximum orientation of the sensor unit 100 in the first embodiment of the invention.

FIG. 5 is a graph illustrating the voltage characteristic of a middle frequency side component of the detective signal to the angle θ between the tangent to the discharged water flow and the maximum orientation of the sensor unit 100.

The discharged water flow from the spout 30 includes also many middle frequency side components of not less than 50 Hz provided that the full frequency band of the detective signal is 0 to 100 Hz. The voltage values of the middle frequency side components of this detective signal become small when the maximum orientation of the radio wave is substantially orthogonal to the discharged water flow (the tangential direction) as illustrated in FIG. 5. More specifically, they become small when θ is about 80° to about 120°. This results from the fact that, since the traveling direction of the radio wave comes close to a direction orthogonal to the flow direction of the discharged water, the Doppler effect appears less readily.

Therefore, by disposing the sensor unit 100 so that the maximum orientation of the radio wave radiated from the sensor unit 100 may be substantially orthogonal to the discharged water flow discharged from the water discharge unit, the detection can be performed while middle frequency side components in the detective signal are kept as small as possible when the discharged water flow is not disordered (when only the start of water discharge is performed). The orientation range of the sensor unit 100 may be, for example, within a range of 35° to 40° both vertically and horizontally to the maximum orientation mentioned above.

On the other hand, when the discharged water flow is disordered, water scattered due to the contact of the discharged water flow with a human hand is scattered in many directions including those toward or away from the sensor unit 100, for example. In this case, even if the sensor unit 100 is disposed so that the maximum orientation may be substantially orthogonal to the discharged water flow as mentioned above, a detective signal of not only low frequency side components but also middle frequency side components corresponding to the disorder of the discharged water flow is obtained.

In the case where the direction of the discharged water flow and the maximum radiation direction of the radio wave are not substantially orthogonal to each other, the difference tends to be small between the detective signal of only the discharged water flow and the detective signal in the state in which the discharged water flow is in contact with a human hand or the like. In contrast, by making the direction of the discharged water flow and the maximum radiation direction of the radio wave substantially orthogonal to each other, middle frequency side components do not appear in the detective signal of only the discharged water flow, and middle frequency side components appear when a hand or the like is in contact with the discharged water flow to be causing a disorder. In other words, a clear difference occurs between the detective signal of only the discharged water flow and the detective signal at the time when the discharged water flow is disordered by a hand or the like. This enables such a control as: continues the start of water discharge when a hand or the like is in contact with the discharged water flow; and performs the stop of water discharge when the detective signal of only the discharged water flow is obtained.

Figure 6A:
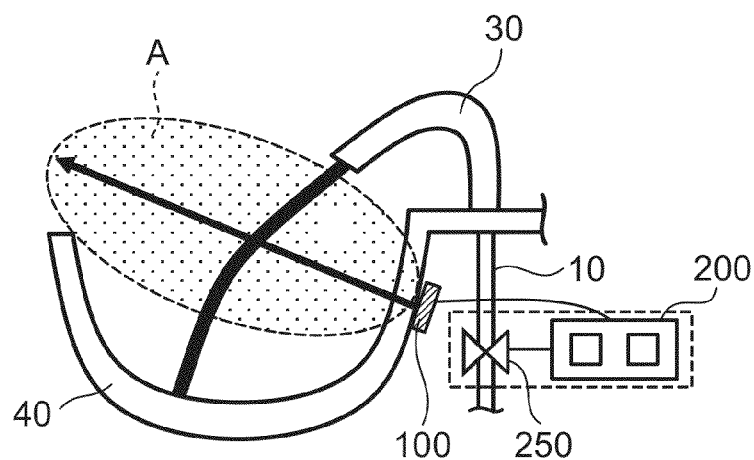
FIGS. 6A to 6C are schematic views illustrating the faucet apparatus in the case where only the start of water discharge is performed and in the case where the discharged water is being used in the embodiment of the invention.
Figure 6B:
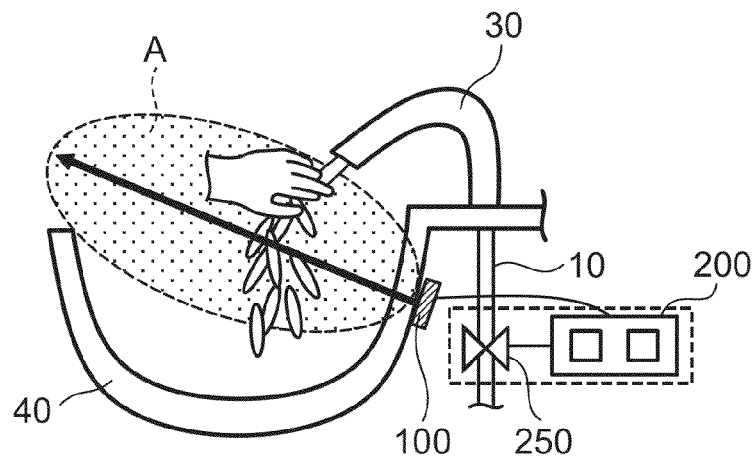
Figure 6C:
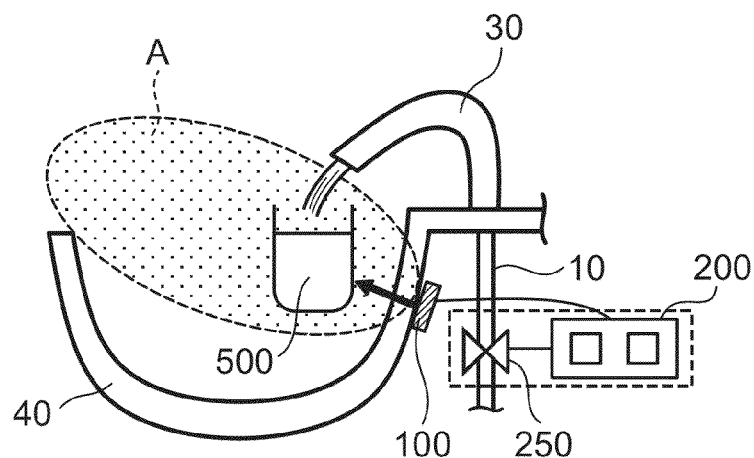

FIGS. 6A to 6C are schematic views illustrating the faucet apparatus in the case where only the start of water discharge is performed and in the case where the discharged water is being used, where FIG. 6A illustrates the case where the discharged water is not being used (the case where only the start of water discharge is performed), FIG. 6B illustrates the case where a person washes his hand (the case where the discharged water flow is disordered) as an example in which the discharged water is being used, and FIG. 6C illustrates the case where water is being stored in a glass 500.

Figure 7:
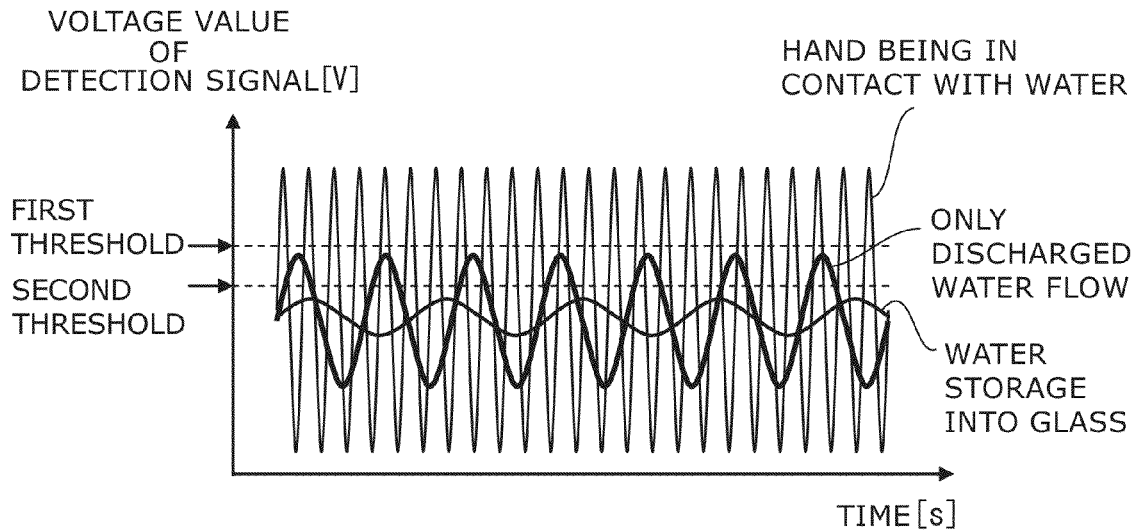
FIG. 7 is a graph illustrating the levels of detective signals obtained from the sensor unit 100 in the cases illustrated in FIGS. 6A to 6C.

FIG. 7 is a graph illustrating the levels of detective signals obtained from the sensor unit 100 in the cases illustrated in FIGS. 6A to 6C. That is, the vertical axis of the drawing represents the voltage value of the detective signal obtained from the sensor unit 100, and the horizontal axis represents the time.

As illustrated in FIG. 7, the amplitude of the detective signal around a reference value is large in the state in which a hand is in contact with the discharged water flow, and in contrast the amplitude of the detective signal is small in the water flow state in which only the start of water discharge from the water discharge unit is performed (there is only the discharged water flow). Furthermore, the amplitude of the detective signal is still smaller in the state in which the discharged water is being stored in a glass or the like.

As described later in detail, the power spectrum of the detective signal of only the discharged water flow has a maximum peak of amplitude in a frequency band of 20 Hz to 30 Hz, for example. In contrast, the power spectrum of the detective signal at the time of hand-washing (in the case where the discharged water is in contact with a human hand) has a plurality of very large peaks of amplitude in a frequency band of 0 to 30 Hz and also a peak of amplitude in a frequency band of 40 Hz to 50 Hz, for example. This occurs because the discharged water flow comes into contact with a hand or the like and the flow is disordered or scattered around. Furthermore, the power spectrum of the detective signal at the time of water storage (in the case where water is being stored in a glass) illustrated in FIG. 6C has a maximum peak of amplitude in a frequency band of 0 to 10 Hz and almost no power spectra in a frequency band of 30 Hz or more. This results from the fact that, since water settles down in the glass and the water makes a movement like slow waving, peaks look as if they have disappeared.

Furthermore, as illustrated in FIG. 7, the level of the detective signal is large in the state in which a hand is in contact with the discharged water flow even if the detective signal is not limited to a specific frequency, and in contrast the level of the detective signal is small in the water flow state in which only the start of water discharge from the water discharge unit is performed (there is only the discharged water flow). Furthermore, the level of the detective signal is still smaller in the state in which the discharged water is being stored in a glass or the like.

Therefore, as illustrated in FIG. 7, the control of the start of water discharge/the stop of water discharge is possible by appropriately determining a first threshold and a second threshold between the levels (amplitudes) of these detective signals. In other words, a value larger than the amplitude of the detective signal in the water flow state in which only the start of water discharge is performed is set as the first threshold, and a value smaller than the amplitude of the detective signal in the water flow state in which only the start of water discharge is performed is set as the second threshold. In FIG. 7, only one side around the reference value of the detective signals which oscillate around the reference value is illustrated, and also in regard to the first threshold and the second threshold set as amplitudes, only the upper limits thereof are illustrated.

Figure 8:
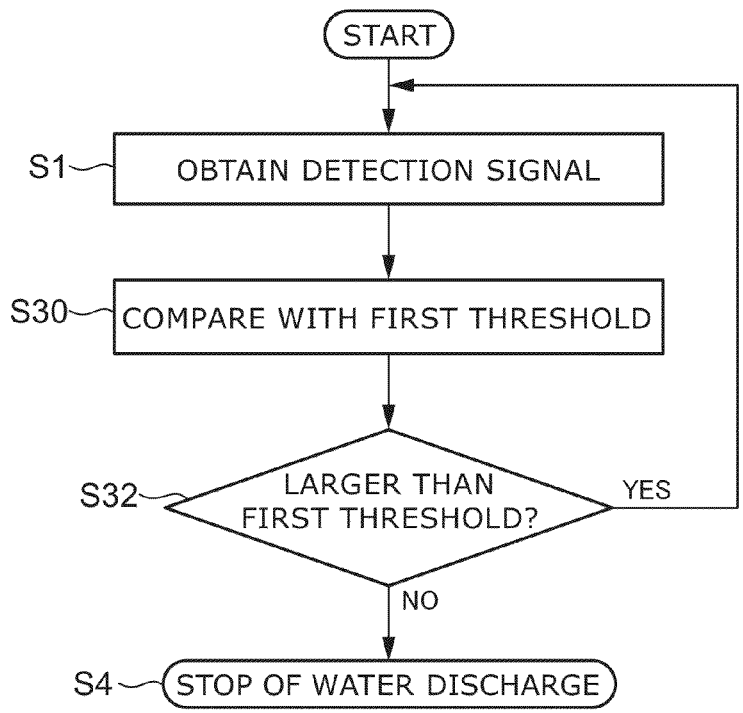
FIG. 8 is a flow chart of the control of the stop of water discharge based on the first threshold.

FIG. 8 is a flow chart of the control of the stop of water discharge based on the first threshold.

A detective signal is obtained from the sensor unit 100 (step S1), and the amplitude of the detective signal is compared with the first threshold stored in the storage mechanics 240 (step S30). In this embodiment, the detective signal need not necessarily be one having experienced filtering into a specific frequency band. In the case where the amplitude of the detective signal is larger than the first threshold (step S32: YES), since this is a state in which the discharged water flow is in contact with a hand or the like, the start of water discharge is continued and the acquisition and comparison of a detective signal are repeated.

Figure 9:
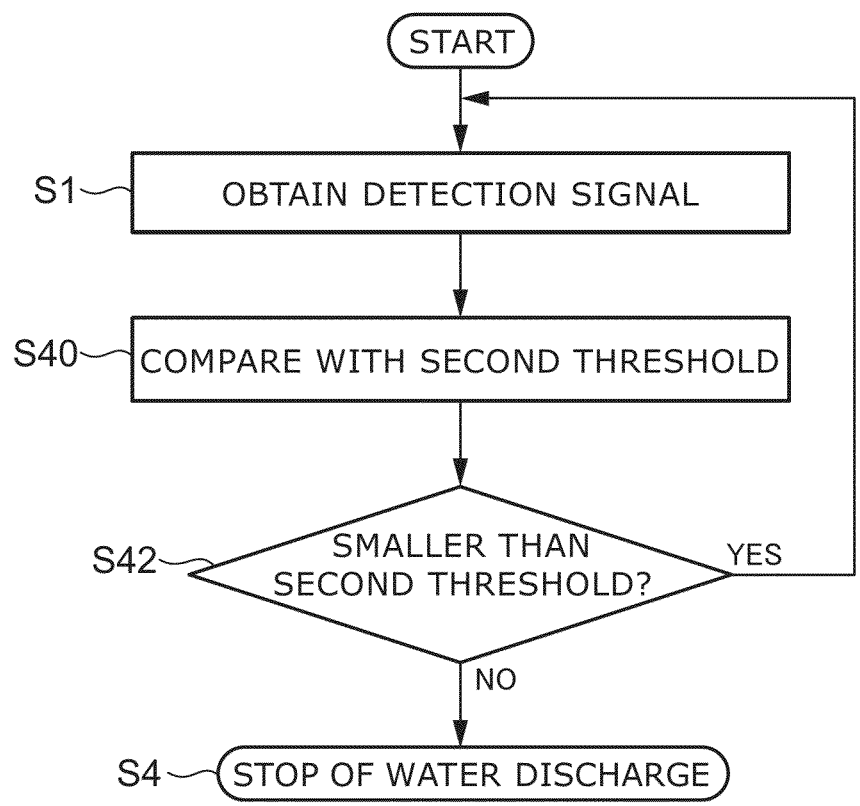
FIG. 9 is a flow chart of the control of the start of water discharge based on the second threshold.

On the other hand, in the case where the amplitude of the detective signal is not more than the first threshold (step S32: NO), since this is not the state in which the discharged water flow is in contact with a hand or the like, the stop of water discharge is performed (step S4). Thus, the control of the start of water discharge/the stop of water discharge is possible even if the detective signal obtained from the sensor unit 100 does not experience filtering into a specific frequency band FIG. 9 is a flow chart of the control of the start of water discharge based on the second threshold.

Also in this specific example, a detective signal is obtained (step S1), and the amplitude thereof is compared with the second threshold stored in the storage mechanics 240 (step S40). Also in this specific example, the detective signal need not necessarily be one having experienced filtering into a specific frequency band. In the case where the amplitude of the detective signal is smaller than the second threshold (step S42: YES), since this is a state in which water storage with a glass or the like is being performed, the start of water discharge is continued, and the acquisition and comparison of a detective signal are repeated.

On the other hand, in the case where the amplitude of the detective signal is not less than the second threshold (step S42: NO), since this is a state in which the glass or the like is removed and there is only the discharged water flow, the start of water discharge is performed (step S4). Also in this specific example, the control of the start of water discharge/the stop of water discharge is possible even if the detective signal does not experience filtering into a specific frequency band.

Figure 10:
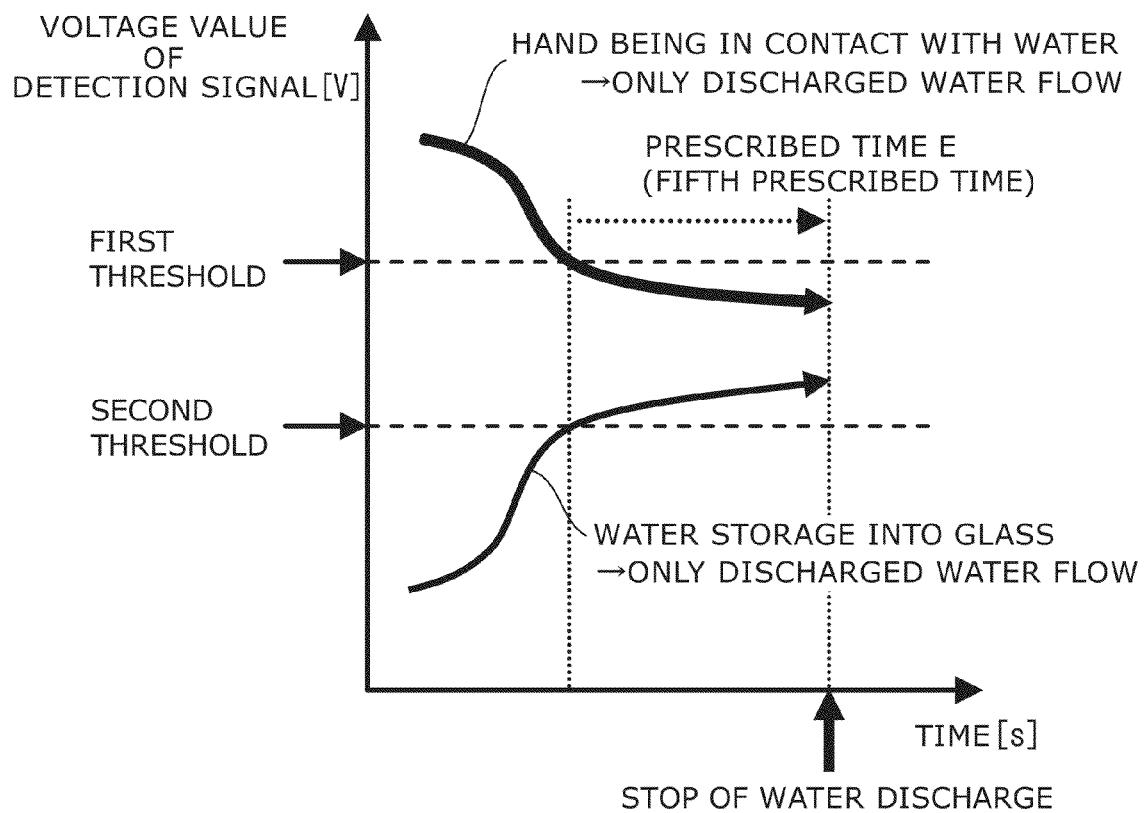
FIG. 10 is a graph for describing the control of the start of water discharge/the stop of water discharge in view of both the first threshold and the second threshold.

FIG. 10 is a graph for describing the control of the start of water discharge/the stop of water discharge in view of both the first threshold and the second threshold. Also in FIG. 10, in regard to the detective signal oscillating around the reference value, only one side around the reference value is illustrated, and also in regard to the first threshold and the second threshold set as amplitudes around the reference value, only the upper end values thereof are illustrated.

In the case where, for example, the state in which a hand or the like is in contact with the discharged water flow changes into the state in which the hand or the like is removed and there is only the discharged water flow, the amplitude of the detective signal changes from a level larger than the first threshold to a level between the first threshold and the second threshold as illustrated by the thick solid line in FIG. 10. Also the detective signal in this case need not necessarily be one having experienced filtering into a specific frequency band. On the other hand, in the case where the state in which the discharged water flow is being stored in a glass or the like changes into the state in which the glass or the like is removed and there is only the discharged water flow, the amplitude of the detective signal changes from a level smaller than the second threshold to a level between the first threshold and the second threshold as illustrated by the thin solid line in FIG. 10.

Figure 11:
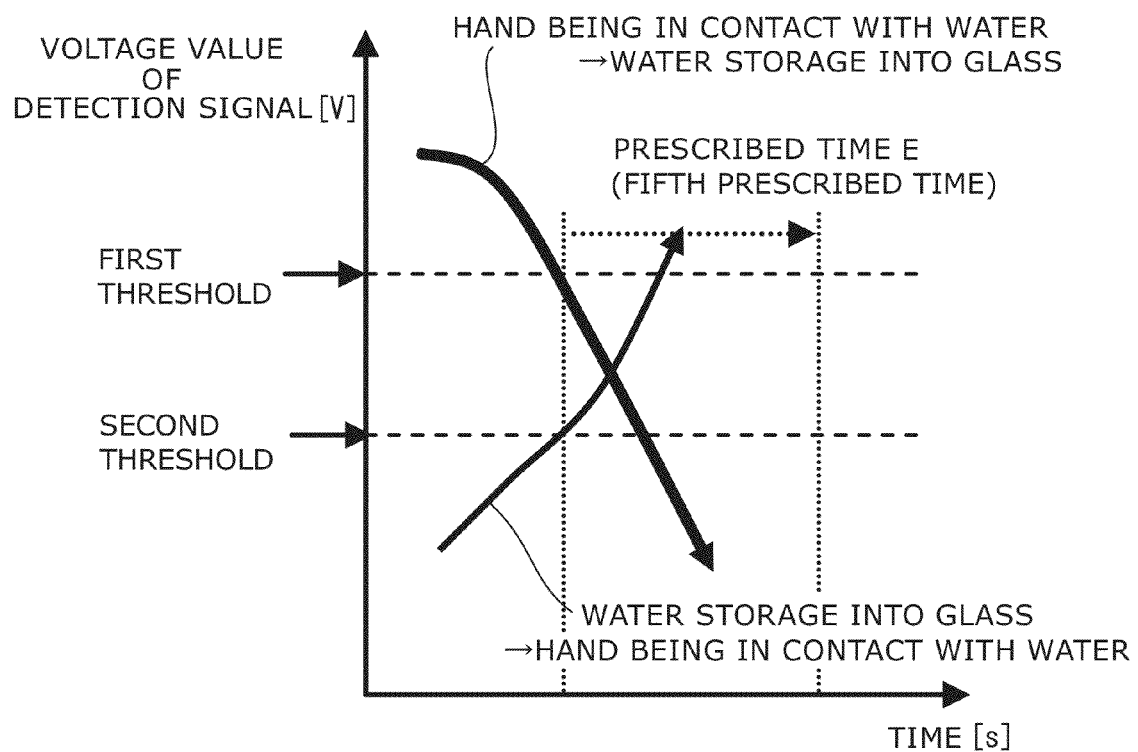
FIG. 11 is a graph for describing another specific example of the control of the start of water discharge/the stop of water discharge in view of both the first threshold and the second threshold.

Although the amplitude of the detective signal is generated discretely over time, the temporal change of the amplitude is illustrated by a continuous curved line for convenience in FIG. 10 and FIG. 11.

Therefore, in any of these cases, the stop of water discharge may be performed when a prescribed time E (fifth prescribed time) has elapsed since the amplitude of the detective signal changed into a level between the first threshold and the second threshold. In this way, both in the case of washing a hand with the water discharge system and in the case of storing water in a glass or the like, the stop of water discharge can be surely performed when these operations are finished.

FIG. 11 is a graph for describing another specific example of the control of the start of water discharge/the stop of water discharge in view of both the first threshold and the second threshold.

In some use manners of the water discharge system, there may be a case where, for example, the state in which a hand or the like is in contact with the discharged water flow changes into the state in which water is being stored in a glass or the like. In this case, the amplitude of the detective signal changes from a level larger than the first threshold to a level smaller than the second threshold as illustrated by the thick solid line in FIG. 11.

On the other hand, there may be also a case where the state in which the discharged water flow is being stored in a glass or the like changes into the state in which the discharged water flow is in contact with a hand or the like. In this case, the amplitude of the detective signal changes from a level smaller than the second threshold to a level larger than the first threshold as illustrated by the thin solid line in FIG. 11. In any of these cases, it is preferable not to perform the stop of water discharge but to continue the start of water discharge. To this end, in the case where the state in which the amplitude of the detective signal is at a level between the first threshold and the second threshold does not continue for the prescribed time E, the start of water discharge may be continued as is. In this way, in those cases where the level of the detective signal crosses the first and second thresholds successively, the start of water discharge can be continued without unnecessary stop of water discharge, and a comfortable use feeling is obtained.

These thresholds are appropriately stored in the storage mechanics 240 of the control unit 200. The determination unit 230 compares the detective signal obtained from the sensor unit 100 and the thresholds stored in the storage mechanics 240 to determine whether to perform the stop of water discharge or not, and controls the opening and closing of the valve 250.

Furthermore, these thresholds may be determined and stored in the storage mechanics 240 in advance, or may be appropriately determined by learning and stored in the storage mechanics 240 in the environment in which the water discharge system is installed and used.

In the case where the thresholds are determined in advance, the thresholds may be determined by experiments and the like in advance when the water discharge system is designed, and may be stored in the storage mechanics 240, for example. Alternatively, the thresholds may be determined by performing the start of water discharge and stored in the storage mechanics 240 before the water discharge system is manufactured in a factory and shipped or when the water discharge system is installed on site.

On the other hand, in the case where the thresholds are determined by learning, the following may be implemented, for example: after the water discharge system is installed on site and caused to start operation, the control unit 200 (see FIG. 2 and FIG. 3) causes the water discharge unit to discharge water at intervals of a prescribed time, determines the thresholds based on the detective signals in the states, and stores the thresholds in the storage mechanics 240. In this case, the determination and storage of the thresholds like this are performed preferably at a time when the water discharge system is less frequently used (e.g. at night) or the like. Furthermore, also the following may be implemented: the control unit 200 (see FIG. 2 and FIG. 3) learns the time when the water discharge system is less frequently used, and performs the determination and storage of the thresholds at the time of less frequent use thus determined. Alternatively, it is also possible to newly determine and store the thresholds in the case where one or both of the start of water discharge and the stop of water discharge is performed prescribed times.

By the way in which the thresholds are appropriately learned after the water discharge system starts operation, the operation can be carried out always based on optimal thresholds even in those cases where, for example, the pressure of supplied water varies and thus the level of the detective signal obtained from the discharged water flow varies.

Figure 12A:
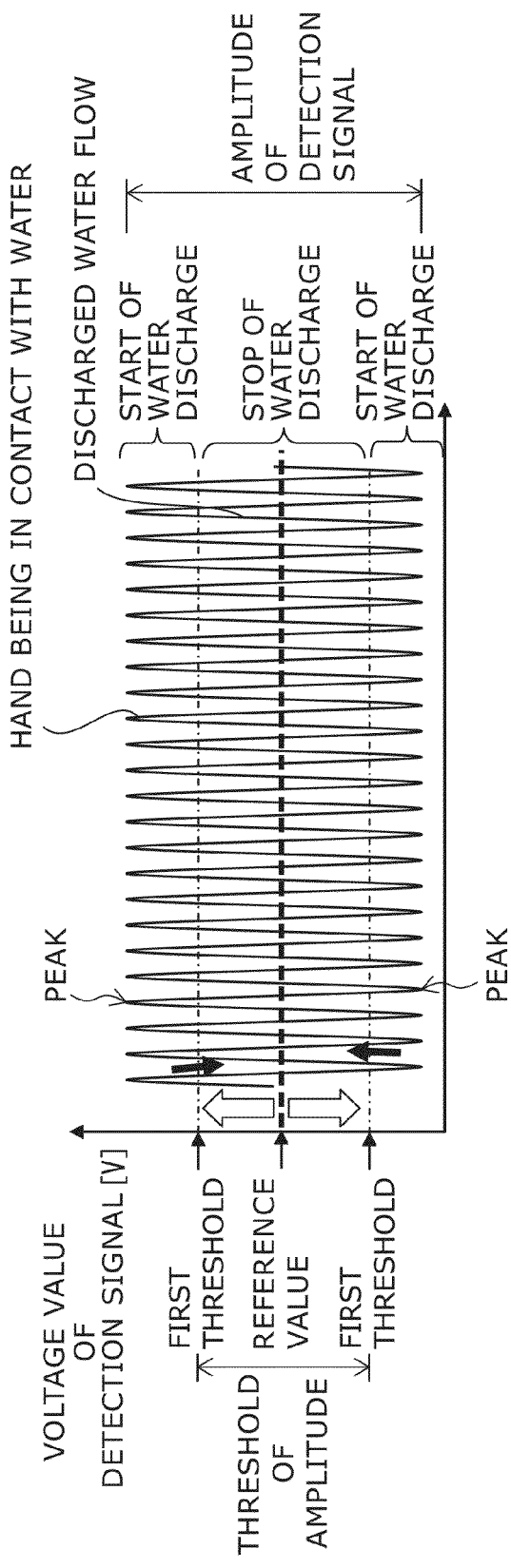
FIGS. 12A and 12B are schematic diagrams for describing the relationship between the detective signal and the threshold.
Figure 12B:
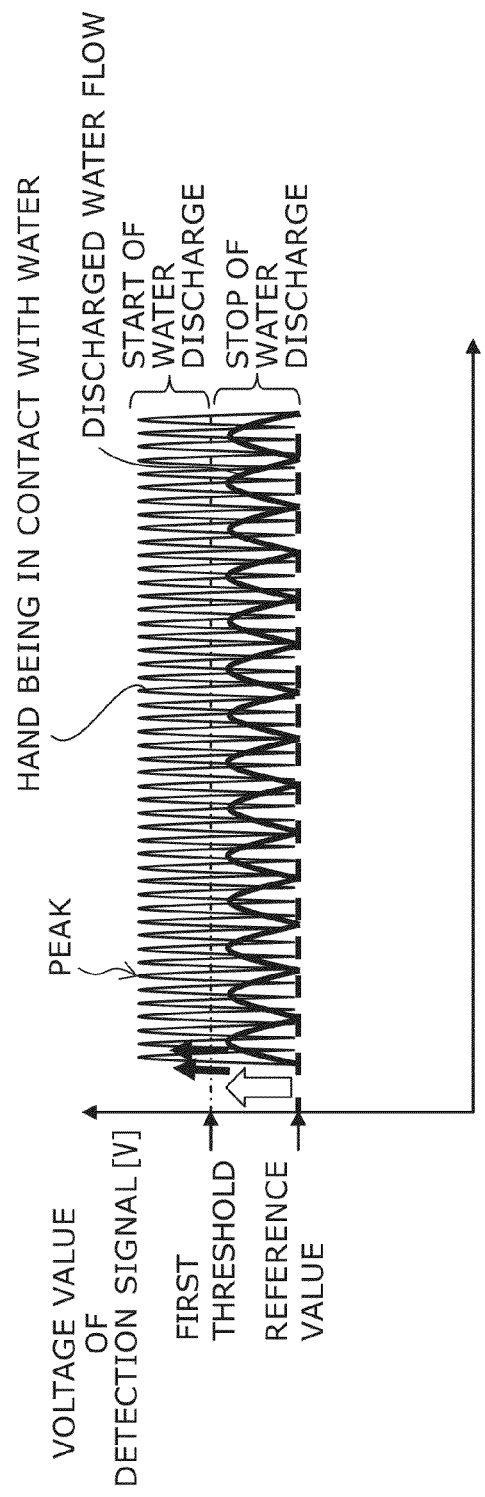

FIGS. 12A and 12B are schematic diagrams for describing the relationship between the detective signal and the threshold.

As illustrated in FIG. 12A, the detective signal is detected as an AC signal oscillating around a prescribed reference value. The reference value (a DC component) may vary in accordance with detection conditions. Therefore, in this embodiment, the state of the discharged water flow is determined by checking the relationship between the amplitude (the spacing between the plus side peak and the minus side peak) of the detective signal oscillating around the reference value and the threshold of the amplitude. Alternatively, as illustrated in FIG. 12A, the state of the discharged water flow may be determined by: setting a prescribed threshold at least one of on the plus side and on the minus side around the reference value; and checking whether the amplitude of the oscillation of the detective signal around the reference value exceeds the threshold or not.

Alternatively, as illustrated in FIG. 12B, it is also possible to find the absolute value of the detective signal by inverting the detective signal around the reference value. This is equivalent, in other words, to comparing the amplitude of the oscillation of the detective signal around the reference value and the prescribed threshold. Also in this case, the state of the discharged water flow can be determined based on whether the amplitude of the oscillation of the detective signal around the reference value exceeds the prescribed threshold or not.

Figure 13A:
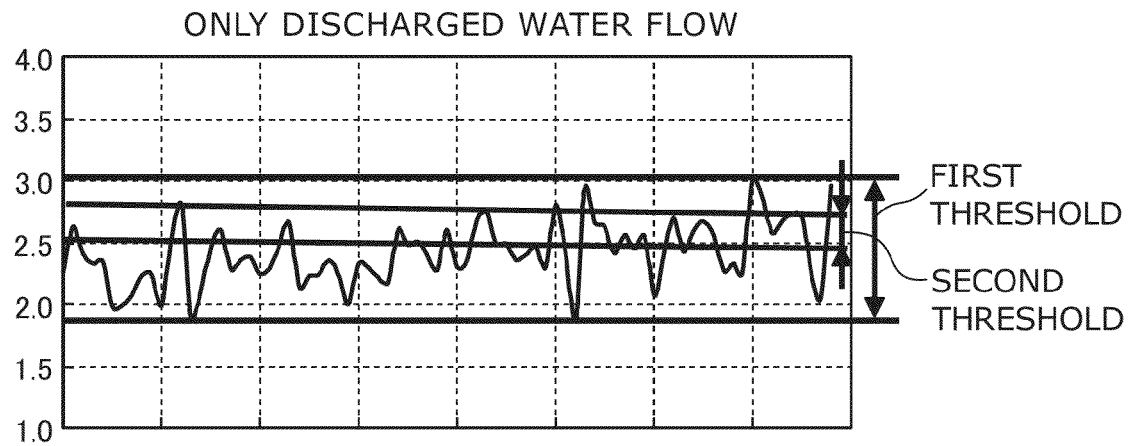
FIGS. 13A to 13C are schematic diagrams illustrating specific examples of the detective signal.
Figure 13B:
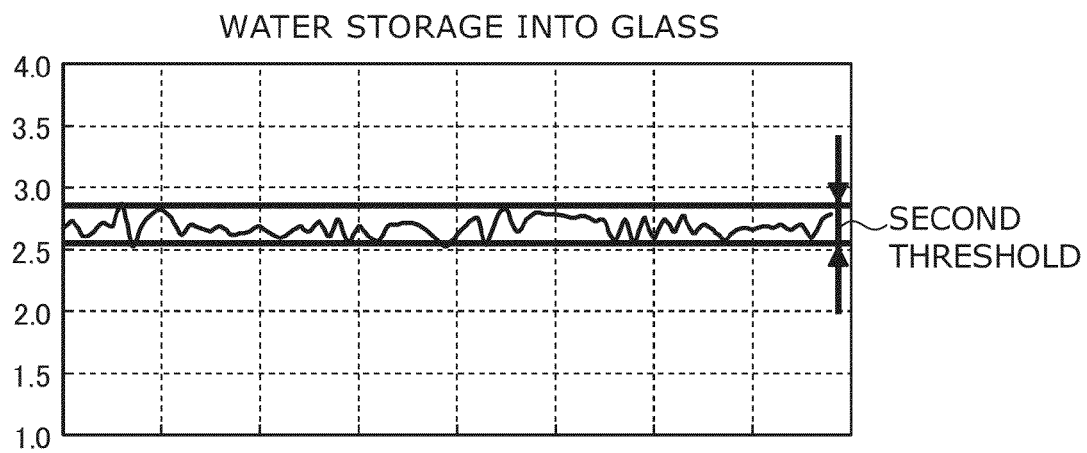
Figure 13C:
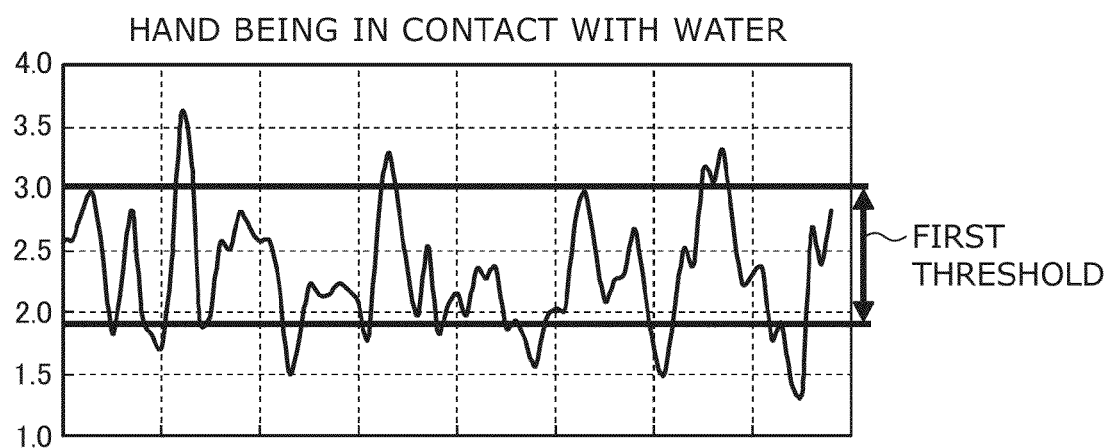

FIGS. 13A to 13C are schematic diagrams illustrating specific examples of the detective signal.

FIG. 13A illustrates the case of the state of only the discharged water flow (corresponding to FIG. 6A), FIG. 13B illustrates the state in which water is being stored in a glass (corresponding to FIG. 6C), and FIG. 13C illustrates the state in which the discharged water flow is in contact with a hand (corresponding to FIG. 6B).

It can be seen that the amplitude of the detective signal in the state in which water is being stored in a glass (FIG. 13B) is small and the amplitude in the state in which the discharged water flow is in contact with a hand (FIG. 13C) is large, as compared with the detective signal in the state of only the discharged water flow (FIG. 13A). Therefore, as illustrated in FIGS. 13A to 13C, the state of the discharged water flow can be determined by setting the first threshold and the second threshold and checking the relationship between the amplitude of the detective signal and these thresholds. That is, in the case where the amplitude of the detective signal does not exceed the first threshold but exceeds the second threshold, it can be determined that this is the state of only the discharged water flow (FIG. 13A). In the case where the amplitude of the detective signal does not exceed the second threshold, it can be determined that this is the state in which water is being stored in a glass (FIG. 13B). On the other hand, in the case where the amplitude of the detective signal exceeds the first threshold, it can be determined that this is the state in which the discharged water flow is in contact with a hand (FIG. 13C).

Figure 14A:
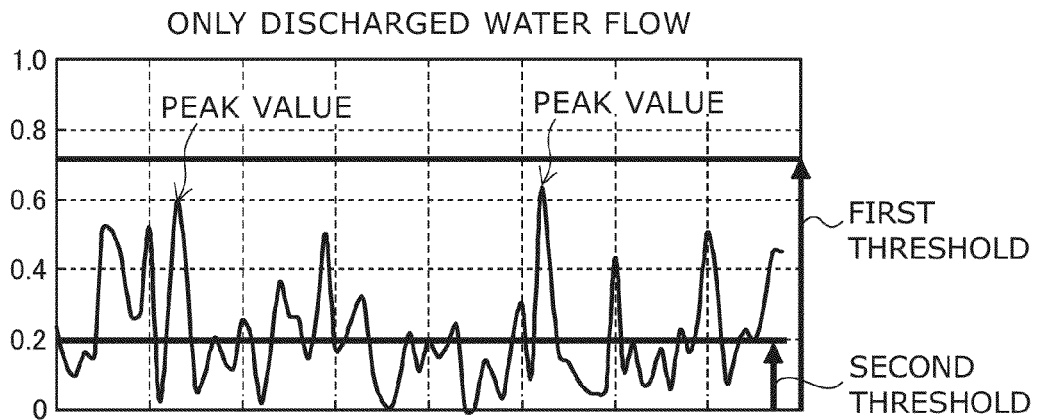
FIGS. 14A to 14C are graphs made by inverting the detective signals around the reference value in the specific examples illustrated in FIGS. 13A to 13C, respectively, and further correcting the reference value to near zero.
Figure 14B:
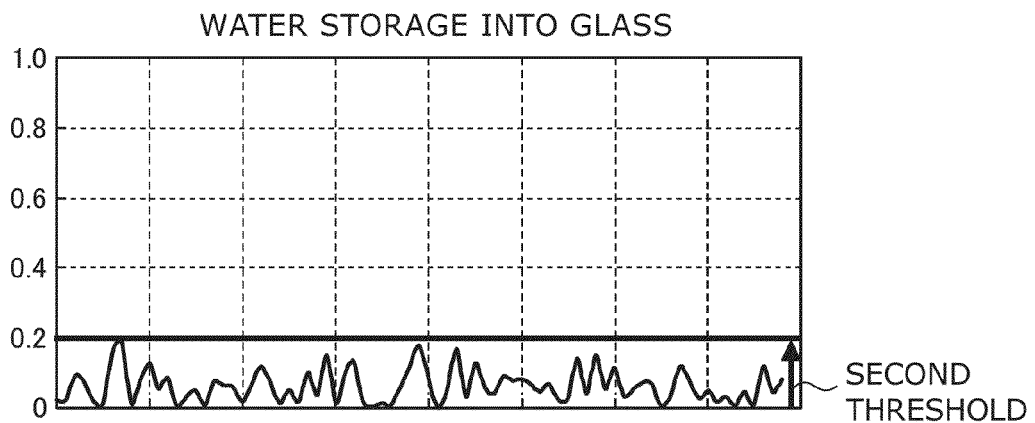
Figure 14C:
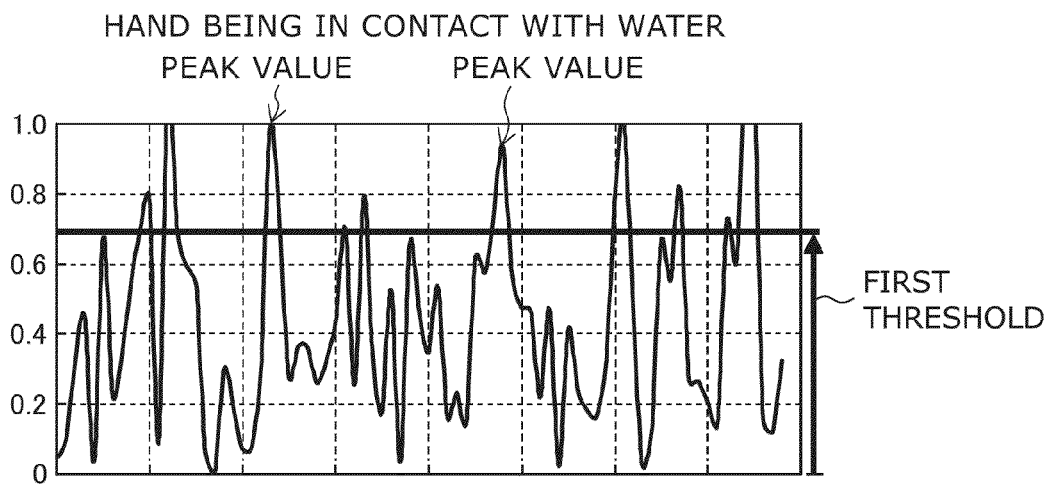

FIGS. 14A to 14C are graphs made by inverting the detective signals around the reference value in the specific examples illustrated in FIGS. 13A to 13C, respectively, and further correcting the reference value to near zero.

The absolute value of the detective signal is obtained by inverting around the reference value. That is, the amplitude of the detective signal is obtained. Therefore, the state of the discharged water flow can be detected by checking the relationship between the amplitude and the first and second thresholds.

More specifically, as illustrated in FIGS. 14A to 14C, in the case where the first threshold and the second threshold are set and the amplitude of the detective signal does not exceed the first threshold but exceeds the second threshold, it can be determined that this is the state of only the discharged water flow (FIG. 14A). In the case where the amplitude of the detective signal does not exceed the second threshold, it can be determined that this is the state in which water is being stored in a glass (FIG. 14B). On the other hand, in the case where the amplitude of the detective signal exceeds the first threshold, it can be determined that this is the state in which the discharged water flow is in contact with a hand (FIG. 13C).

Here, at the time of the determination described above in regard to FIGS. 13A to 13C and FIGS. 14A to 14C, the frequency of cases where the peak of the detective signal exceeds the threshold, for example, may be considered. That is, the peak of the detective signal may become large due to noise or the like. In order to prevent a mistaken detection due to such noise, the following may be implemented: the frequency of cases where the peak of the detective signal exceeds the prescribed threshold is checked; and in the case where the frequency exceeds a prescribed value, it is determined that the peak of the detective signal exceeds the threshold. Alternatively, in order to prevent a mistaken detection due to noise, the following may be implemented: the time average of the detective signal is calculated, and the amplitude and the prescribed thresholds are compared similarly to the above.

Specific examples of the control of the start of water discharge/the stop of water discharge based on the detective signal will now be described.

Figure 15:
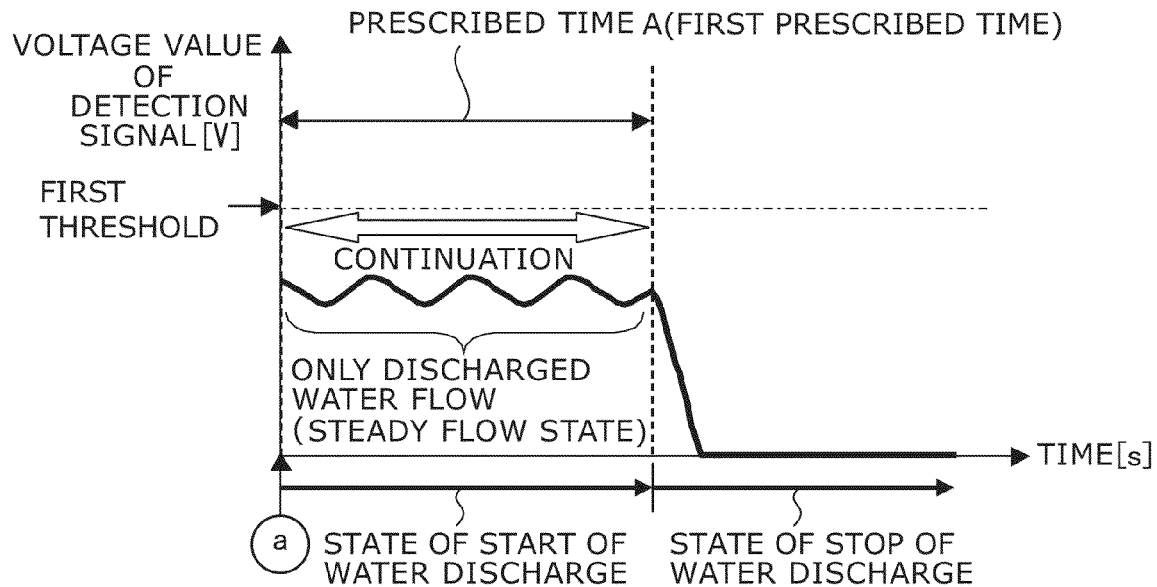
FIG. 15 is a graph for describing a first specific example of the control of the start of water discharge/the stop of water discharge based on the detective signal.

FIG. 15 is a graph for describing a first specific example of the control of the start of water discharge/the stop of water discharge based on the detective signal, where the horizontal axis represents the time and the vertical axis represents the amplitude of the detective signal. That is, FIG. 15 illustrates the temporal change of the amplitude of the detective signal. Here, the amplitude of the detective signal is equivalent to the peak value of the absolute value obtained by inverting the detective signal around the reference value as illustrated in, for example, FIGS. 14A to 14C. Although the amplitude of the detective signal is generated discretely over time, the temporal change of the amplitude is illustrated by a continuous curved line for convenience in FIG. 15 and the subsequent drawings.

In the specific example illustrated in FIG. 15, the first threshold larger than the amplitude of the detective signal in the state in which only the start of water discharge is performed (corresponding to FIG. 6A) is set. Here, as described above in regard to FIGS. 13A to 13C, FIGS. 14A to 14C, and the like, the first threshold is set to a value smaller than the amplitude of the detective signal in the state in which a hand or the like is in contact with the discharged water flow to be causing a disorder (corresponding to FIG. 6B).

Then, when the state in which the amplitude of the detective signal is below the first threshold continues for a prescribed time "A" (first prescribed time), the valve 250 (see FIGS. 1A and 1B) is closed to stop the water discharge from the spout 30 (stop of water discharge). In other words, if the state in which the amplitude of the detective signal is below the first threshold continues for the prescribed time "A", it is possible to determine that the discharged water is not being used and to perform the stop of water discharge. This enables to surely perform the stop of water discharge when the discharged water is not being used.

In the case where, for example, the start of water discharge is performed by a switch and the stop of water discharge is performed by the detective signal of the sensor unit 100, the stop of water discharge can be surely performed in those cases where the discharged water is not being used for the prescribed time "A" from a moment "a" at which the water discharge is started by the switch.

Figure 16:
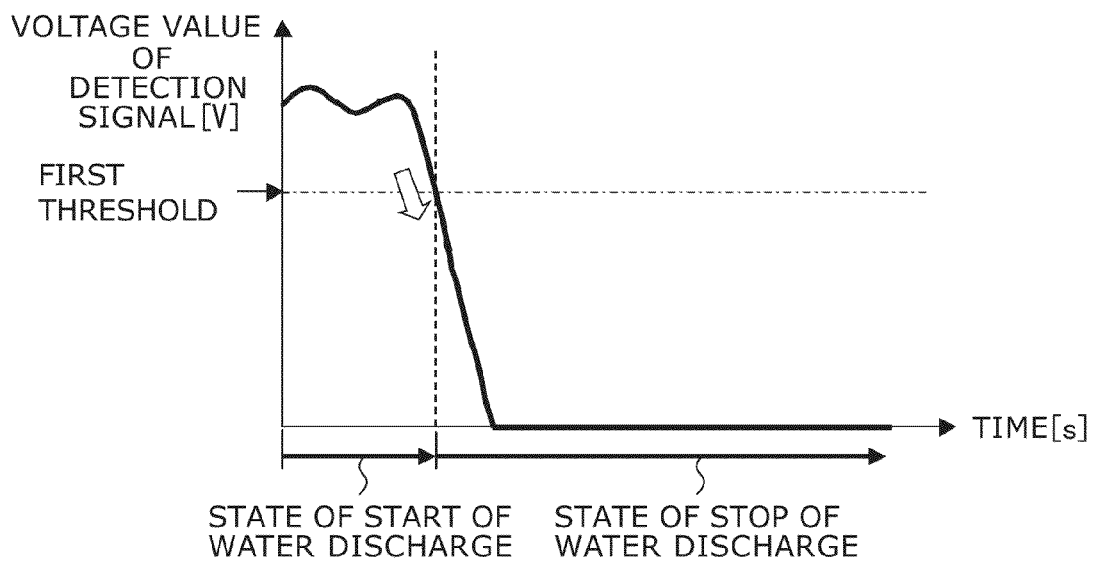
FIG. 16 is a graph for describing a second specific example of the control of the start of water discharge/the stop of water discharge based on the detective signal.

FIG. 16 is a graph for describing a second specific example of the control of the start of water discharge/the stop of water discharge based on the detective signal, where the horizontal axis represents the time and the vertical axis represents the amplitude of the detective signal.

Also in this specific example, the first threshold larger than the amplitude of the detective signal in the state in which only the start of water discharge is performed (corresponding to FIG. 6A) is set. Then, when the amplitude of the detective signal falls below the first threshold from the state of exceeding the first threshold, the valve 250 (see FIGS. 1A and 1B) is closed to stop the water discharge from the spout 30 (stop of water discharge). This typically corresponds to the case where the state in which the discharged water flow is disordered in contact with a hand or the like (corresponding to FIG. 6B) changes into the state of only the discharged water flow (corresponding to FIG. 6A).

This enables also to perform the stop of water discharge before a user pulls out his hand from the discharged water flow to bring about a change into the state of only the discharged water flow. In other words, the stop of water discharge can be performed with early timing, and this provides an excellent use feeling and the water-saving effect as well.

Figure 17:
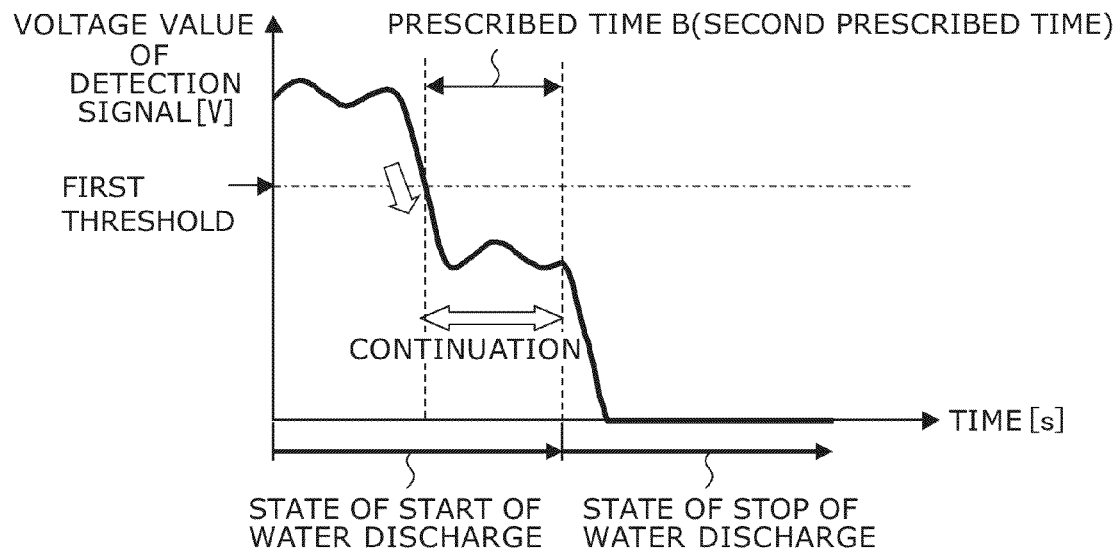
FIG. 17 is a graph for describing a third specific example of the control of the start of water discharge/the stop of water discharge based on the detective signal.

FIG. 17 is a graph for describing a third specific example of the control of the start of water discharge/the stop of water discharge based on the detective signal, where the horizontal axis represents the time and the vertical axis represents the amplitude of the detective signal.

Also in this specific example, the first threshold larger than the amplitude of the detective signal in the state in which only the start of water discharge is performed (corresponding to FIG. 6A) is set. Then, when the amplitude of the detective signal falls below the first threshold from the state of exceeding the first threshold and the state of being smaller than the first threshold continues for a prescribed time "B" (second prescribed time), the valve 250 (see FIGS. 1A and 1B) is closed to stop the water discharge from the spout 30 (stop of water discharge). This typically corresponds to the case where the stop of water discharge is performed when: the state in which the discharged water flow is disordered in contact with a hand or the like (corresponding to FIG. 6B) changes into the state of only the discharged water flow (corresponding to FIG. 6A); and the prescribed time "B" has elapsed.

In this way, after a user pulls out his hand or the like from the discharged water flow, the stop of water discharge can be performed with timing determined by the prescribed time "B". In other words, the timing of the stop of water discharge can be adjusted in accordance with the site of use, the type of faucet, a user's liking, and the like.

Figure 18:
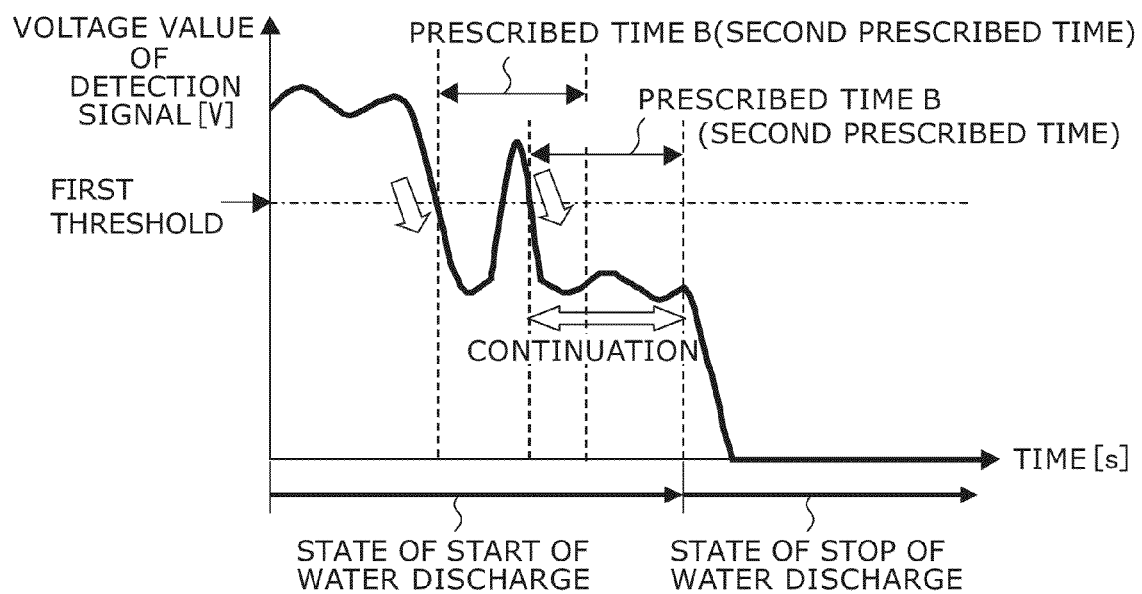
FIG. 18 is a graph for describing a fourth specific example of the control of the start of water discharge/the stop of water discharge based on the detective signal.

FIG. 18 is a graph for describing a fourth specific example of the control of the start of water discharge/the stop of water discharge based on the detective signal, where the horizontal axis represents the time and the vertical axis represents the amplitude of the detective signal.

This specific example is similar to the third specific example described above in regard to FIG. 17. That is, also in this specific example, the first threshold larger than the amplitude of the detective signal in the state of only the start of water discharge is performed (corresponding to FIG. 6A) is set. Then, when the amplitude of the detective signal falls below the first threshold from the state of exceeding the first threshold and the state of being smaller than the first threshold continues for the prescribed time "B" (second prescribed time), the valve 250 (see FIGS. 1A and 1B) is closed to stop the water discharge from the spout 30 (stop of water discharge). However, in the case where the amplitude of the detective signal exceeds the first threshold before the prescribed time "B" elapses, the stop of water discharge is performed when thereafter the amplitude falls again below the first threshold and the state of being smaller than the first threshold continues for the prescribed time "B". In other words, in the case where the amplitude of the detective signal again exceeds the first threshold during the count of the prescribed time "B", the count of the prescribed time "B" is stopped and reset, and the count is again started from the beginning.

In this way, in those cases where, for example, a user pulls out his hand or the like from the discharged water flow and immediately thereafter wants to put his hand again into the discharged water flow, the discharged water flow is not immediately stoped, and the stop of water discharge can be surely performed after the use by the user has finished. That is, in the case where the discharged water flow is used intermittently and repeatedly and the like, the stop of water discharge is not performed each time, and an excellent use feeling is obtained.

Figure 19:
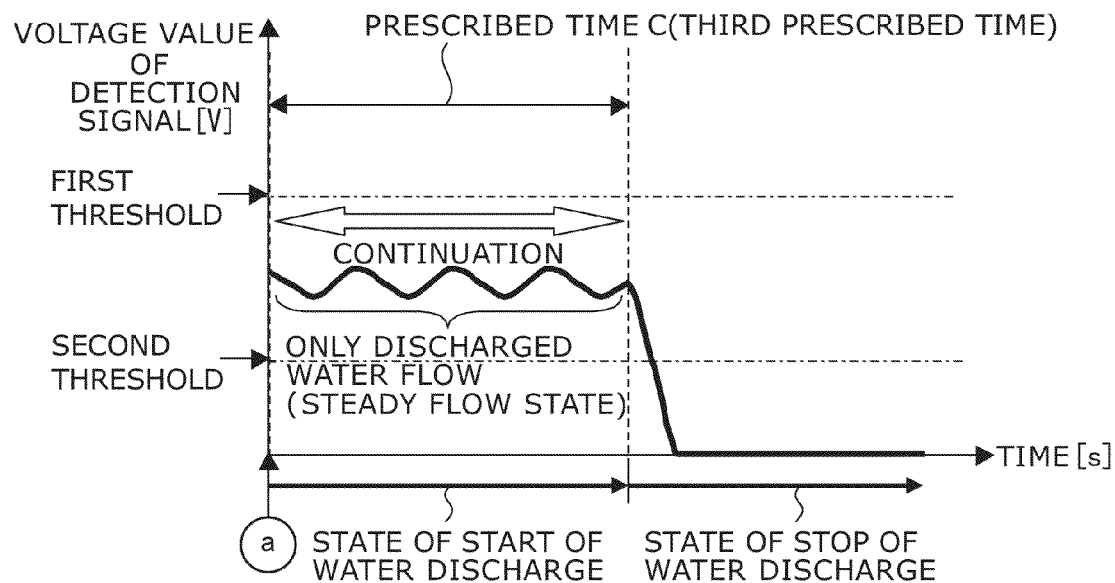
FIG. 19 is a graph for describing a fifth specific example of the control of the start of water discharge/the stop of water discharge based on the detective signal.

FIG. 19 is a graph for describing a fifth specific example of the control of the start of water discharge/the stop of water discharge based on the detective signal, where the horizontal axis represents the time and the vertical axis represents the amplitude of the detective signal.

Also in this specific example, the first threshold larger than the amplitude of the detective signal in the state in which only the start of water discharge is performed (corresponding to FIG. 6A) is set. Furthermore, in this specific example, the second threshold smaller than the amplitude of the detective signal in the state in which only the start of water discharge is performed (corresponding to FIG. 6A) is set. Also here, as described above in regard to FIGS. 13A to 13C, FIGS. 14A to 14C, and the like, the first threshold is set to a value smaller than the amplitude of the detective signal in the state in which a hand or the like is in contact with the discharged water flow to be causing a disorder (corresponding to FIG. 6B). On the other hand, as described above in regard to FIGS. 13A to 13C, FIGS. 14A to 14C, and the like, the second threshold is set to a value larger than the amplitude of the detective signal in the state in which water is being stored in a glass or the like (corresponding to FIG. 6C).

Then, when the state in which the amplitude of the detective signal is smaller than the first threshold and larger than the second threshold continues for a prescribed time "C" (third prescribed time), the stop of water discharge is performed. That is, the stop of water discharge is performed when any other state than both the one in which water is being stored in a glass or the like and the one in which the discharged water flow is disordered in contact with a hand or the like continues for the prescribed time C.

This enables to surely perform the stop of water discharge in those cases where the discharged water is not being used for the prescribed time "C", similarly to the first specific example described above in regard to FIG. 15.

Figure 20:
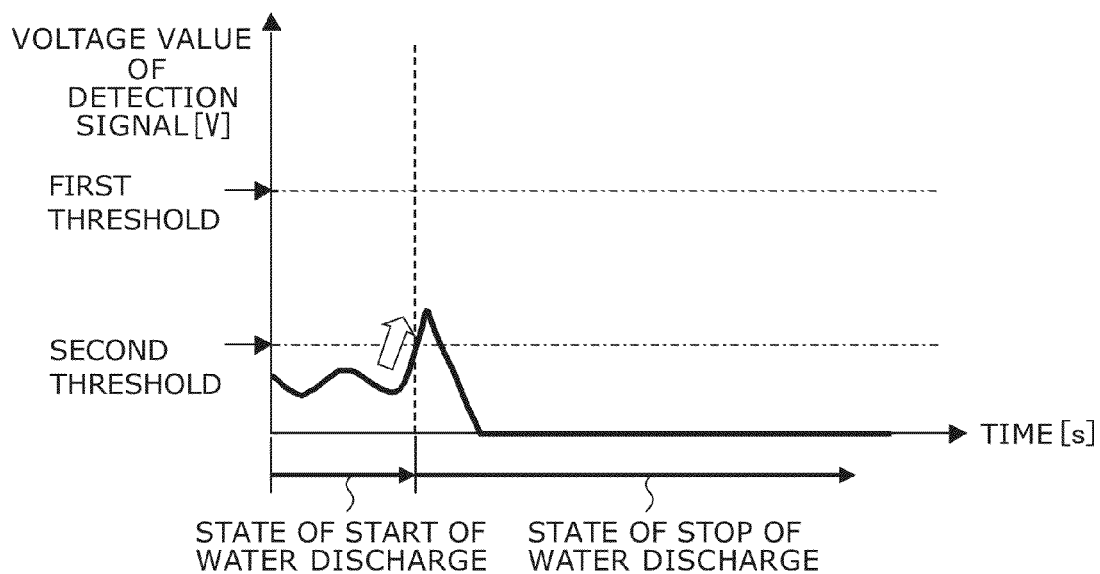
FIG. 20 is a graph for describing a sixth specific example of the control of the start of water discharge/the stop of water discharge based on the detective signal.

FIG. 20 is a graph for describing a sixth specific example of the control of the start of water discharge/the stop of water discharge based on the detective signal, where the horizontal axis represents the time and the vertical axis represents the amplitude of the detective signal.

Also in this specific example, the first threshold larger than the amplitude of the detective signal in the state in which only the start of water discharge is performed (corresponding to FIG. 6A) is set similarly to the fifth specific example. Furthermore, the second threshold smaller than the amplitude of the detective signal in the state in which only the start of water discharge is performed (corresponding to FIG. 6A) is set. Also here, as described above in regard to FIGS. 13A to 13C, FIGS. 14A to 14C, and the like, the first threshold is set to a value smaller than the amplitude of the detective signal in the state in which a hand or the like is in contact with the discharged water flow to be causing a disorder (corresponding to FIG. 6B). On the other hand, as described above in regard to FIGS. 13A to 13C, FIGS. 14A to 14C, and the like, the second threshold is set to a value larger than the amplitude of the detective signal in the state in which water is being stored in a glass or the like (corresponding to FIG. 6C).

Then, when the amplitude of the detective signal exceeds the second threshold from the state of being smaller than the second threshold, the stop of water discharge is performed. That is, the stop of water discharge is performed if a glass or the like is removed from the state in which water is being stored in the glass or the like.

This enables also to perform the stop of water discharge before a user pulls out a glass or the like from the discharged water flow to bring about a change into the state of only the discharged water flow, similarly to the second specific example described above in regard to FIG. 16. In other words, the stop of water discharge can be performed with early timing, and this provides an excellent use feeling and the water-saving effect as well.

Figure 21:
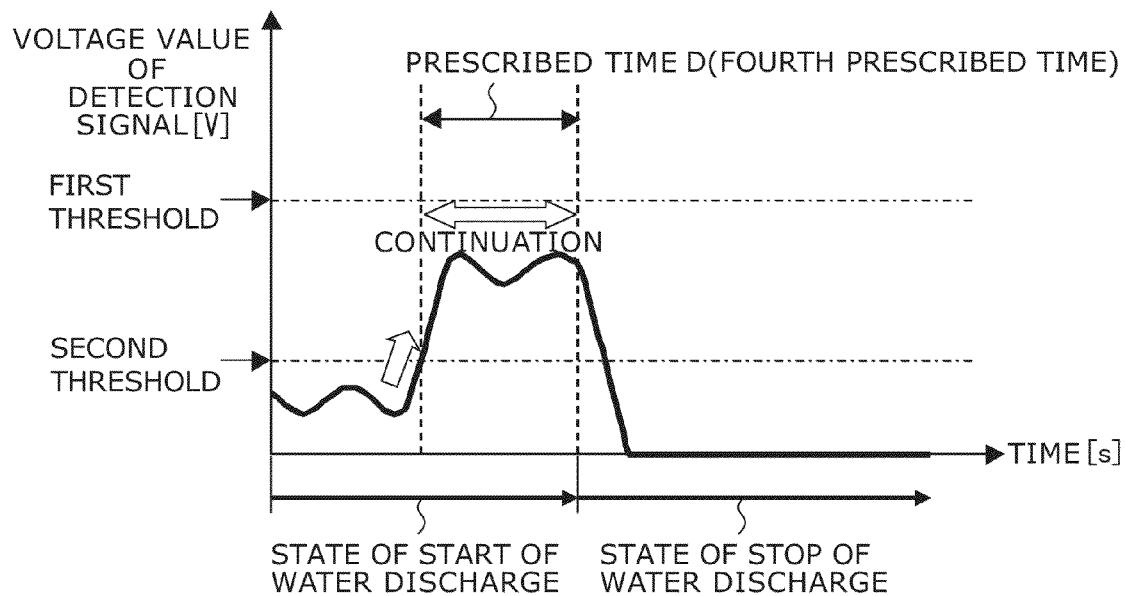
FIG. 21 is a graph for describing a seventh specific example of the control of the start of water discharge/the stop of water discharge based on the detective signal.

FIG. 21 is a graph for describing a seventh specific example of the control of the start of water discharge/the stop of water discharge based on the detective signal, where the horizontal axis represents the time and the vertical axis represents the amplitude of the detective signal.

Also in this specific example, the first threshold larger than the amplitude of the detective signal in the state in which only the start of water discharge is performed (corresponding to FIG. 6A) is set similarly to the fifth specific example. Furthermore, the second threshold smaller than the amplitude of the detective signal in the state in which only the start of water discharge is performed (corresponding to FIG. 6A) is set.

Then, when the amplitude of the detective signal exceeds the second threshold from the state of being smaller than the second threshold and the state of being smaller than the first threshold continues for a prescribed time "D" (fourth prescribed time), the stop of water discharge is performed. This corresponds to the case where the stop of water discharge is performed when: the state in which water is being stored in a glass or the like (corresponding to FIG. 6C) changes into the state of only the discharged water flow (corresponding to FIG. 6A); and the prescribed time "D" has elapsed.

In this way, after a user pulls out a glass or the like from the discharged water flow, the stop of water discharge can be performed with timing determined by the prescribed time "D". In other words, the timing of the stop of water discharge can be adjusted in accordance with the site of use, the type of faucet, a user's liking, and the like.

Figure 22:
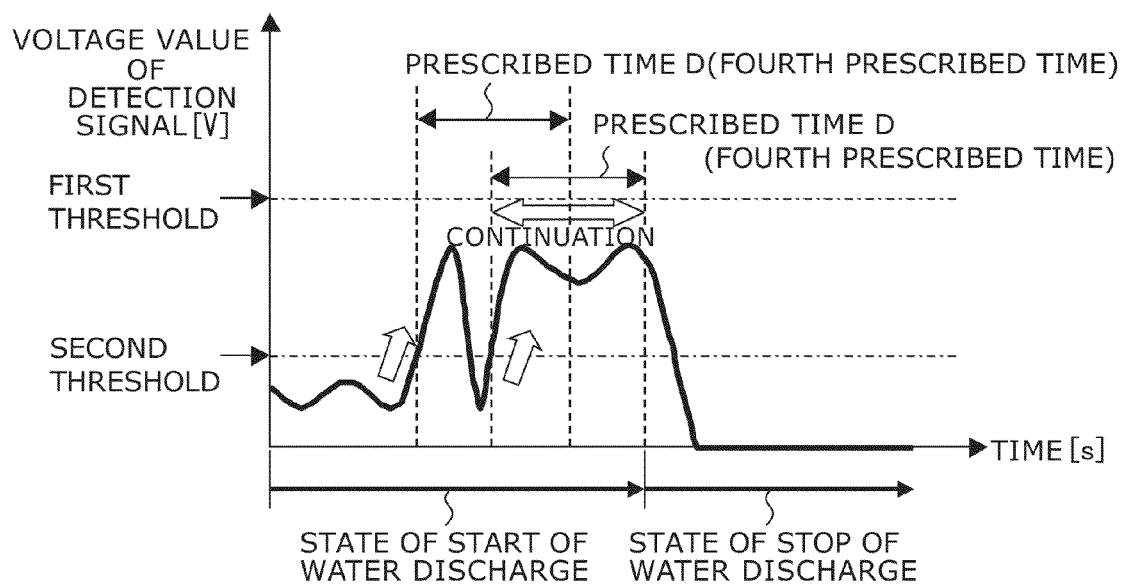
FIG. 22 is a graph for describing an eighth specific example of the control of the start of water discharge/the stop of water discharge based on the detective signal.

FIG. 22 is a graph for describing an eighth specific example of the control of the start of water discharge/the stop of water discharge based on the detective signal, where the horizontal axis represents the time and the vertical axis represents the amplitude of the detective signal.

This specific example is similar to the seventh specific example described above in regard to FIG. 20. That is, also in this specific example, the first threshold larger than the amplitude of the detective signal in the state in which only the start of water discharge is performed (corresponding to FIG. 6A) is set similarly to the fifth specific example. Furthermore, the second threshold smaller than the amplitude of the detective signal in the state in which only the start of water discharge is performed (corresponding to FIG. 6A) is set.

Then, in the case where: the amplitude of the detective signal becomes a level of over the second threshold and below the first threshold from the state of being smaller than the second threshold; and before the prescribed time "D" (fourth prescribed time) elapses from this state, the amplitude of the detective signal becomes again smaller than the second threshold, the stop of water discharge is performed when thereafter the amplitude again becomes a level of over the second threshold and below the first threshold and this state continues for the prescribed time "D". In other words, in the case where the amplitude of the detective signal becomes again smaller than the second threshold during the count of the prescribed time "D", the count of the prescribed time "D" is stopped and reset, and the count is again started from the beginning.

In this way, in those cases where, for example, a user pulls out a glass or the like from the discharged water flow and immediately thereafter wants to again put the glass or the like into the discharged water flow, the discharged water flow is not immediately stoped, and the stop of water discharge can be surely performed after the use by the user has finished. That is, in the case where the discharged water flow is used intermittently and repeatedly and the like, the stop of water discharge is not performed each time, and an excellent use feeling is obtained.

Furthermore, in the case where the stop of water discharge is performed by counting the prescribed time "D" like this, when, for example, a user who has stored water in a glass pulls out the glass from the discharged water flow and subsequently washes his hand, the user may put his hand into the discharged water flow during the prescribed time "D"; thereby, the start of water discharge is not suspended, and an excellent use feeling is obtained.

Hereinabove, specific examples of the control of the start of water discharge/the stop of water discharge based on the detective signal are described with reference to FIG. 15 to FIG. 22. In this embodiment, the detective signal may be one obtained via a designated filter or a signal obtained without using a filter. In the case where a filter is used, only signals of 200 Hz or less, for example, may be used as the detective signal, or only signals of several hertz or more may be used as the detective signal. Alternatively, these filters may be used in combination.

On the other hand, in this embodiment, the determination may be performed based on the amplitude of the detective signal in a specific frequency band.

Figure 23A:
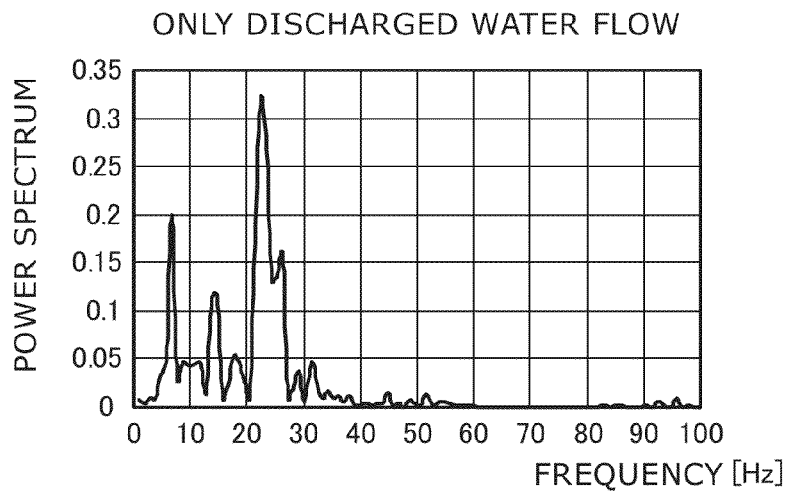
FIGS. 23A to 23C are graphs illustrating the power spectra of detective signals in this embodiment.
Figure 23B:
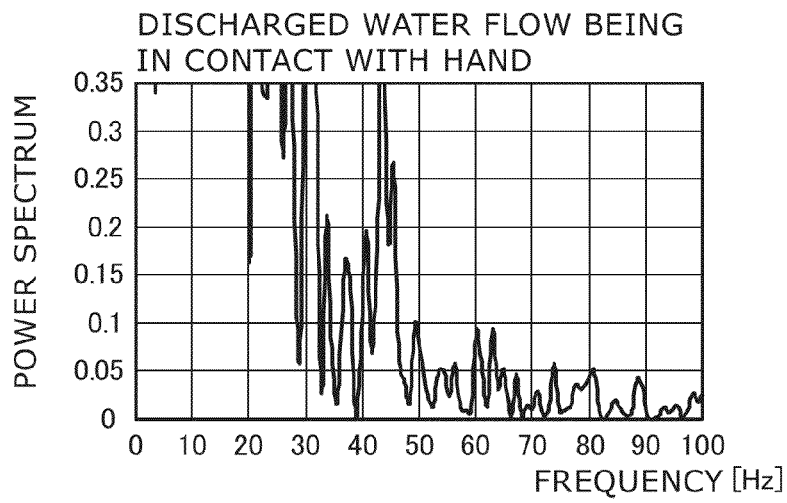
Figure 23C:
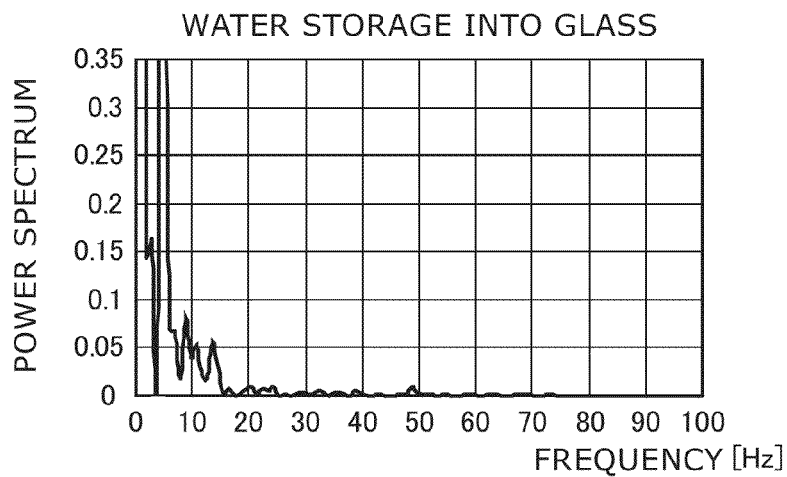

FIGS. 23A to 23C are graphs illustrating the power spectra of detective signals, where FIG. 23A illustrates the state in which the discharged water flow is not disordered (corresponding to the case of FIG. 6A), FIG. 23B illustrates the state in which a person puts the discharged water on his hand (the state in which the discharged water flow is disordered; corresponding to the case of FIG. 6B), and FIG. 23C illustrates the state in which water is being stored in a glass (the state in which the discharged water flow is disordered; corresponding to the case of FIG. 6C).

In the case where the disposition is made so that the maximum orientation of the radio wave of the sensor unit 100 may be substantially orthogonal to the flow (tangential direction) of the discharged water flow, the detective signal (FIG. 23A) of only the not-disordered discharged water flow (the water flow state in which only the start of water discharge from the water discharge unit is performed) and the detective signal (FIGS. 23B and 23C) of the discharged water flow disordered by being used for hand-washing or water storage can be clearly distinguished from each other in the power spectra of the detective signals as illustrated in FIGS. 23A to 23C.

That is, the frequency band in which a peak appears is different between the power spectra of FIGS. 23A, 23B, and 23C. For example, the power spectrum of the detective signal of only the discharged water flow illustrated in FIG. 23A has the maximum peak in a frequency band of 20 Hz to 30 Hz. In contrast, the power spectrum of the detective signal at the time of hand-washing (in the case where the discharged water is in contact with a human hand) illustrated in FIG. 23B has a plurality of very large peaks in a frequency band of 0 to 30 Hz and also peaks in a frequency band of 40 Hz to 50 Hz. This results from the fact that the discharged water flow comes into contact with a hand or the like to be disordered or scattered around. Furthermore, as illustrated in FIG. 23C, the power spectrum of the detective signal at the time of water storage (in the case where water is being stored in a glass) has the maximum peak in a frequency band of 0 to 10 Hz, and few power spectra appear in a frequency band of 30 Hz or more. This results from the fact that, since water settles down in the glass and the water makes a movement like slow waving, peaks look as if they have disappeared.

The continuation of the start of water discharge and the stop of water discharge can be controlled by utilizing a difference in power spectrum between the states described above. That is, the first threshold larger than the amplitude of the detective signal at the time when only the start of water discharge is performed and the second threshold smaller than the amplitude of the detective signal at the time when only the start of water discharge is performed are set in a prescribed frequency band. For example, in the case where the amplitude of the detective signal in a frequency band of 40 to 50 Hz exceeds a prescribed threshold (the first threshold), it is possible to determine that a hand or the like is in contact with the discharged water flow and to continue the start of water discharge as illustrated in FIG. 23B. Furthermore, in the case where the amplitude of the detective signal in a frequency band of 20 to 30 Hz is below a prescribed threshold (the second threshold), it is possible to determine that water storage is being performed with a glass or the like and to continue the start of water discharge as illustrated in FIG. 23C.

Furthermore, in the case where the amplitude of the detective signal in a frequency band of 20 to 30 Hz is over a prescribed threshold (the second threshold) and the amplitude of the detective signal in a frequency band of 40 to 50 Hz is below a prescribed threshold (the first threshold), it is possible to determine that the detective signal of only the discharged water flow is obtained and to perform the stop of water discharge as illustrated in FIG. 23A.

The power spectra illustrated in FIGS. 23A, 23B, and 23C are only one example. The power spectrum at the time when there is only the discharged water flow, when a human hand or the like is in contact with the discharged water flow, or when water is being stored in a glass or the like may be appropriately set at the time of applying the invention. Furthermore, also the number of frequency bands in which the threshold of the detective signal is set for the continuation of the start of water discharge or the stop of water discharge is not limited to only one or two, but it is also possible to set a threshold in each of three or more frequency bands and to perform the determination of the continuation of the start of water discharge or the stop of water discharge based on these thresholds.

Moreover, as described later in detail, the determination may be performed also based on the amplitude of the detective signal in a frequency band of, for example, several hertz to 100 Hz. For example, in the specific example illustrated in FIGS. 7A to 7C, the amplitude of the detective signal in a frequency band of 10 Hz to 200 Hz is largest in the state in which a hand is in contact with the discharged water flow (FIG. 23B); it is smaller when only the start of water discharge is performed (FIG. 23A) than at the time mentioned above; and it is smallest in the state in which water is being stored in a glass (FIG. 23C). Therefore, it is also possible to control the start of water discharge/the stop of water discharge based on the relationship between the amplitude of the detective signal and a prescribed threshold.

In this embodiment, in regard to the procedure for determining whether there is only the discharged water or not by comparing the detective signal and a prescribed threshold, whether the detective signal is that of only the discharged water flow or not can be determined also by comparing a signal component in one specific frequency band (division frequency band) in the full frequency band of the detective signal and a prescribed threshold. As the frequency band in which the comparison is performed, a band is set in which the difference between the case of only the discharged water flow and the case where the discharged water is being used is significant.

Figure 24A:
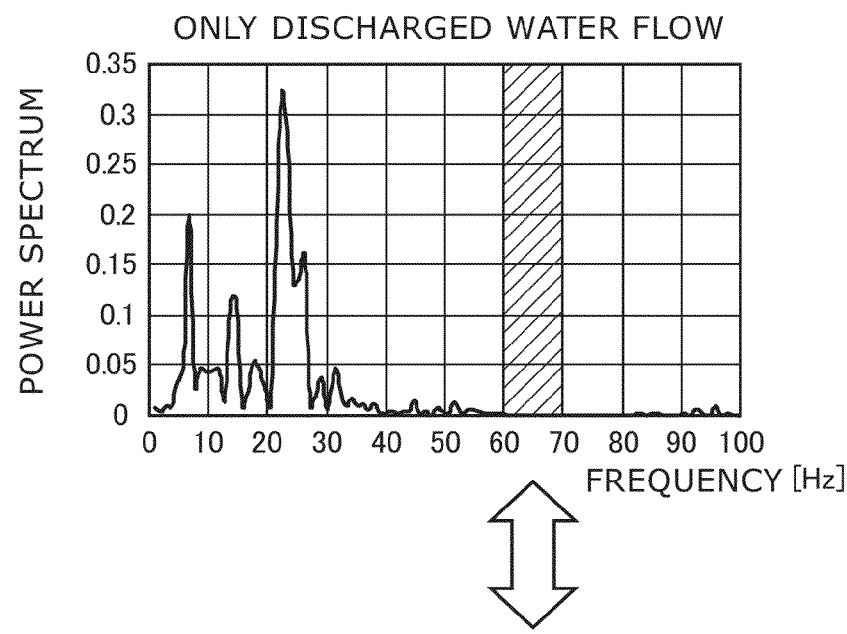
FIGS. 24A and 24B are graphs illustrating the power spectra of detective signals for describing the procedure of the comparison of the detective signal and the determination of the stop of water discharge in the embodiment of the invention.
Figure 24B:
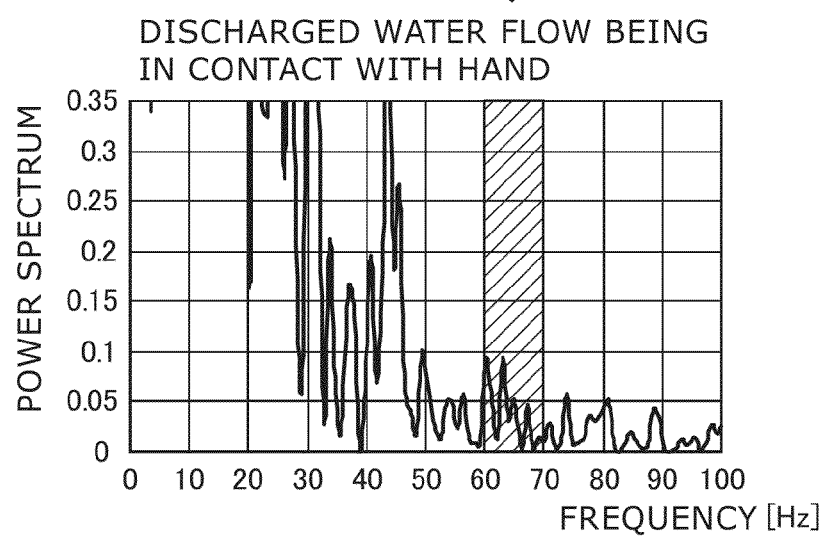

FIGS. 24A and 24B are graphs illustrating the power spectra of detective signals for describing the procedure of the comparison of the detective signal and the determination of the stop of water discharge in this embodiment, where FIG. 24A illustrates the power spectrum of the detective signal in the case of only the discharged water flow, and FIG. 24B illustrates the power spectrum of the detective signal in the case where the discharged water is in contact with a hand (in the case where the discharged water is being used).

In FIGS. 24A and 24B, a frequency band of 60 Hz to 70 Hz is set as the specific frequency band in which the comparison is performed. In other words, the control unit 200 compares only components in a frequency band of 60 Hz to 70 Hz of the obtained detective signal in the procedure of the comparison between the amplitude of the detective signal and a prescribed threshold. In this frequency band of 60 Hz to 70 Hz, few power spectra appear in the case of only the discharged water flow, but relatively large power spectra appear when the discharged water flow is in contact with a hand, and the difference is significant.

It is known that, in this frequency band of 60 Hz to 70 Hz, the power spectrum of the detective signal at the time when the discharged water is in contact with a hand is larger than that in the case of only the discharged water flow. Accordingly, the procedure of the determination of the stop of water discharge by the control unit 200 may be as follows, for example.

One threshold (the first threshold) is set in advance for the detective signal in the case of only the discharged water flow, and the amplitude of the detective signal of a component in a frequency band of 60 Hz to 70 Hz of the obtained detective signal is compared with the threshold mentioned above. If the amplitude exceeds the threshold mentioned above, it is determined that the detective signal is one at the time when the discharged water is being used (being not the detective signal of only the discharged water flow). If the amplitude is not more than the threshold mentioned above, it is determined that the detective signal is that of only the discharged water flow.

Alternatively, it is also possible to calculate the accumulated value of the power spectra (or voltages) of components in a frequency band of 60 Hz to 70 Hz of the obtained detective signal and to compare the accumulated value with a previously set threshold.

Alternatively, it is also possible to add the values of a plurality of local maxima of the power spectra (or voltages) of components in a frequency band of 60 Hz to 70 Hz of the obtained detective signal and to compare the additional value with a previously set threshold.

Furthermore, the threshold mentioned above may experience a correction as necessary, as well as being a fixed value. The procedure of the threshold correction may be as follows, for example: a threshold correction operation mode is provided in the control unit 200; the detective signal of only the discharged water flow is obtained more than once; and the threshold is corrected to an appropriate value in accordance with the actual measurement values of components in a frequency band of 60 Hz to 70 Hz of the obtained detective signals.

Figure 25A:
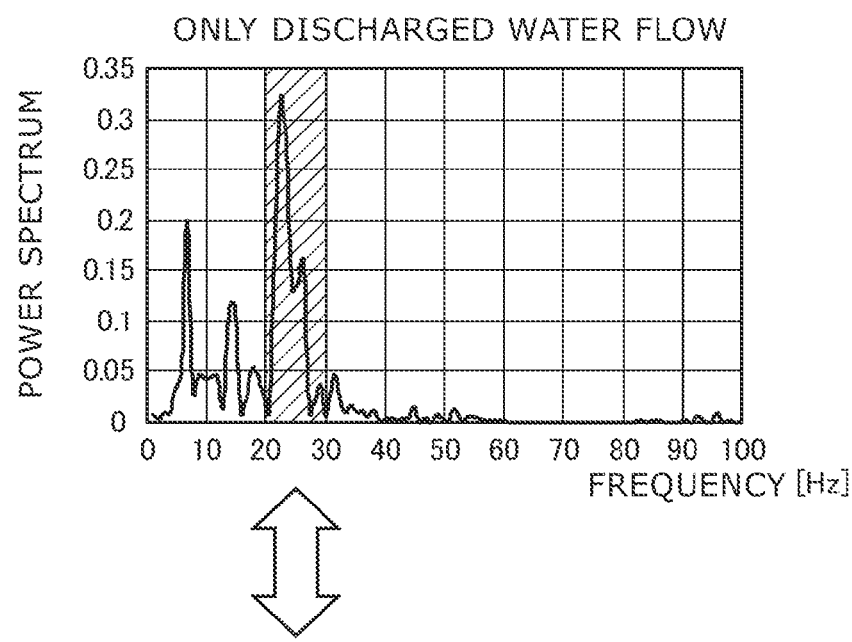
FIGS. 25A and 25B are graphs illustrating the power spectra of detective signals for describing the procedure of the comparison of the detective signal and the determination of the stop of water discharge in the embodiment of the invention.
Figure 25B:
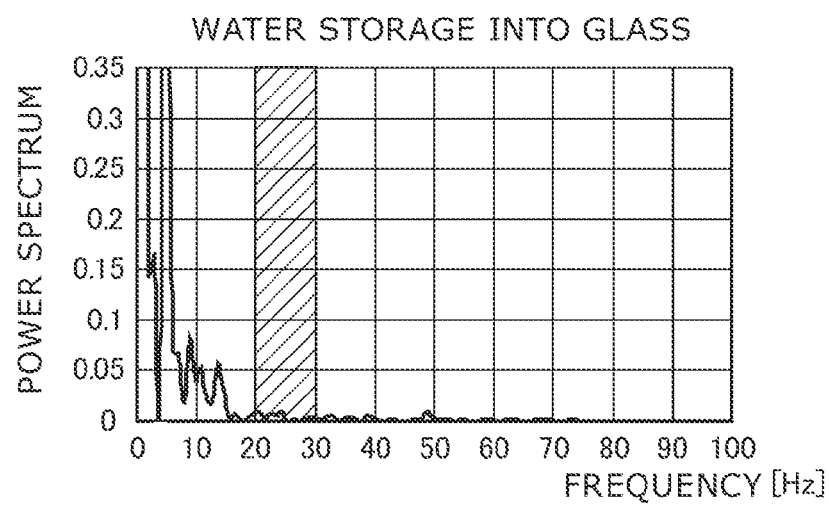

FIGS. 25A and 25B are graphs illustrating the power spectra of detective signals for describing the procedure of the comparison of the detective signal and the determination of the stop of water discharge in this embodiment, where FIG. 25A illustrates the power spectrum of the detective signal in the case of only the discharged water flow, and FIG. 25B illustrates the power spectrum of the detective signal in the case where water is being stored in a glass (the case where the discharged water is being used).

In FIGS. 25A and 25B, a frequency band of 20 Hz to 30 Hz is set as the specific frequency band in which the comparison is performed. In this 20 Hz to 30 Hz, power spectra appear in the case of only the discharged water flow, but few power spectra appear when water is being stored in a glass, and the difference is significant.

Therefore, the procedure of the determination of the stop of water discharge by the control unit 200 for this frequency band of 20 Hz to 30 Hz is as follows, as in the case of FIGS. 24A and 24B, for example.

One threshold (the second threshold) is set for the detective signal in the case of only the discharged water flow; and the amplitude (or the accumulated value or the additional value of the values of a plurality of local maxima) of the detective signal of a component/components in a frequency band of 20 Hz to 30 Hz of the obtained detective signal is compared with the threshold mentioned above. If exceeding the threshold mentioned above, it is determined that the detective signal is that of only the discharged water flow. If being not more than the threshold mentioned above, it is determined that the detective signal is one at the time when the discharged water is being used (being not the detective signal of only the discharged water flow).

In this way, the detective signal and the threshold mentioned above may be compared only in one frequency band (division frequency band) in which the difference between the case of only the discharged water flow and the case where the discharged water is being used is significant; thereby, it is not necessary to compare for the full frequency band of the detective signal, and this enables to shorten the arithmetic processing time at the control unit 200 and to reduce the load on the memory. The width of the frequency band in which the comparison is performed is not limited to the 10 Hz mentioned above but may be set to a desired width.

On the other hand, in this embodiment, as the procedure for determining whether there is only the discharged water or not by comparing the detective signal and a prescribed threshold, it is also possible to compare signal components in two specific frequency bands in the full frequency band of the detective signal and a prescribed threshold to determine whether the detective signal is that of only the discharged water or not. Bands in which the difference between the case of only the discharged water flow and the case where the discharged water is being used is significant are set as the two frequency band in which the comparison is performed, similarly to the specific examples described above in regard to FIGS. 24A and 24B and FIGS. 25A and 25B, for example.

Figure 26A:
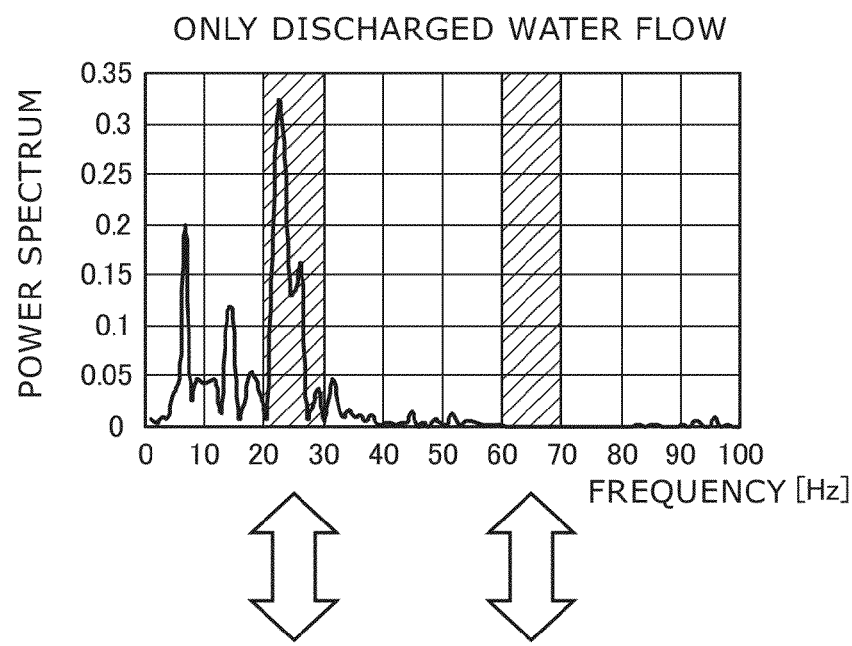
FIGS. 26A and 26B are graphs illustrating the power spectra of detective signals for describing the procedure of the comparison of the detective signal and the determination of the stop of water discharge in the example of the invention.
Figure 26B:
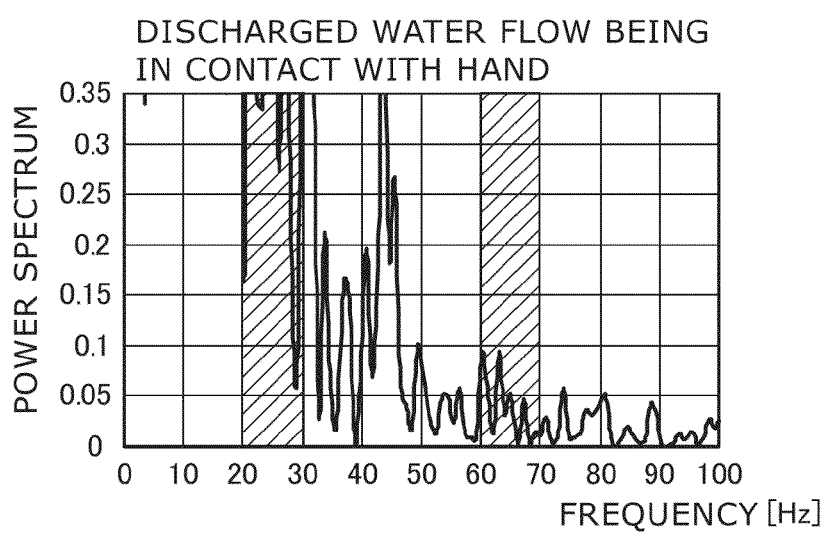

FIGS. 26A and 26B are diagrams illustrating the power spectra of detective signals for describing the procedure of the comparison of the detective signal and the determination of the stop of water discharge in this specific example, where FIG. 26A illustrates the power spectrum of the detective signal in the case of only the discharged water flow, and FIG. 26B illustrates the power spectrum of the detective signal in the case where the discharged water is in contact with a hand (in the case where the discharged water is being used).

In FIGS. 26A and 28B, two frequency bands of 60 Hz to 70 Hz and 20 Hz to 30 Hz are set as the specific frequency bands in which the comparison is performed. In other words, the control unit 200 compares only components in a frequency band of 60 Hz to 70 Hz and components in a frequency band of 20 Hz to 30 Hz of the obtained detective signal in the procedure of the detective signal comparison (step S1 in FIG. 8).

In a frequency band of 60 Hz to 70 Hz, few power spectra appear in the case of only the discharged water flow, but power spectra appear when the discharged water flow comes into contact with a hand. Furthermore, in a frequency band of 20 Hz to 30 Hz, power spectra appear also in the case of only the discharged water flow, and very large power spectra appear when the discharged water flow comes into contact with a hand; and a large value is obtained as the difference value between both detective signals The comparison and determination procedure by the control unit 200 may be as follows, for example: two thresholds (the first threshold for a frequency band of 60 Hz to 70 Hz and the first threshold for a frequency band of 20 Hz to 30 Hz) are set in advance for the detective signal in the case of only the discharged water flow; and the amplitude of the detective signal of a component in a frequency band of 60 Hz to 70 Hz of the obtained detective signal is compared with the first threshold, and the amplitude of the detective signal of a component in a frequency band of 20 Hz to 30 Hz of the obtained detective signal is compared with the first threshold.

Then, if, for example, the amplitude exceeds the first threshold in a frequency band of 60 Hz to 70 Hz and the amplitude exceeds the first threshold in a frequency band of 20 to 30 Hz, it is determined that the detective signal is one at the time when the discharged water is being used (being not the detective signal of only the discharged water flow). On the other hand, if the amplitude is not more than the first threshold in a frequency band of 60 Hz to 70 Hz and the amplitude is not more than the first threshold in a frequency band of 20 to 30 Hz, it is determined that the detective signal is that of only the discharged water flow. Thus, the determination is performed based on the first thresholds in a frequency band of 60 Hz to 70 Hz and a frequency band of 20 Hz to 30 Hz, and the determination using two frequency bands is more accurate than the determination using one frequency band. The accumulated value or the additional value of the values of a plurality of local maxima of power spectra (or voltages) may be used for components in each frequency band of the obtained detective signal.

Figure 27A:
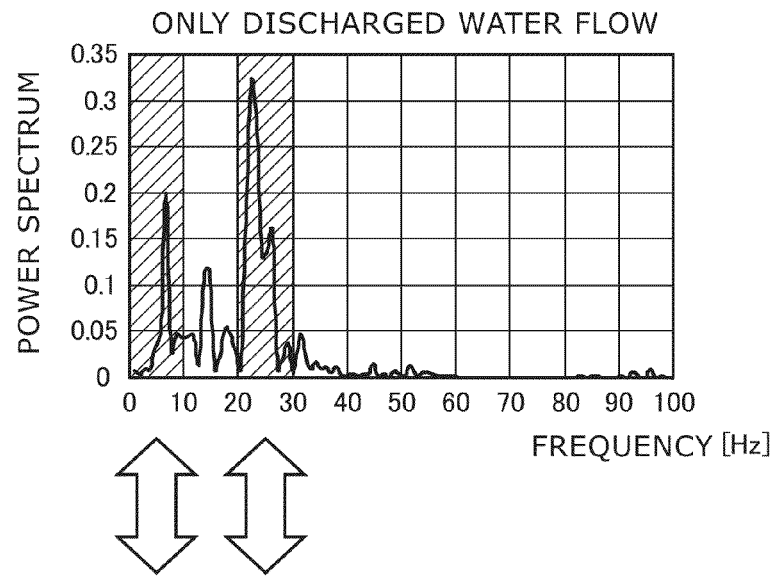
FIGS. 27A and 27B are diagrams illustrating the power spectra of detective signals for describing the procedure of the comparison of the detective signal and the determination of the stop of water discharge in the example of the invention.
Figure 27B:
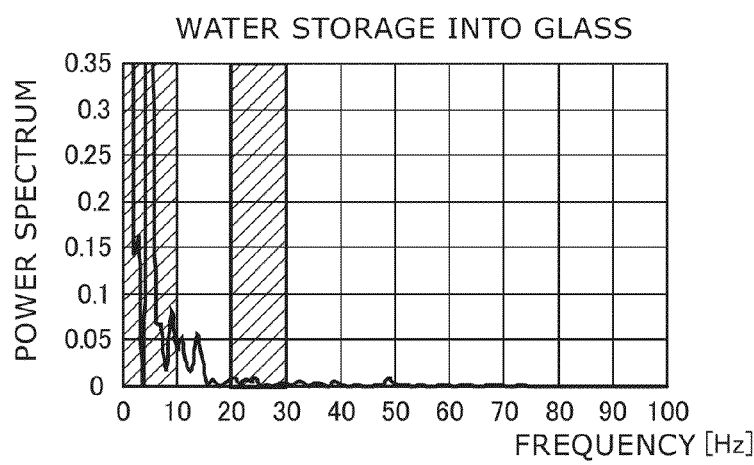

FIGS. 27A and 27B are graphs illustrating the power spectra of detective signals for describing the procedure of the comparison of the detective signal and the determination of the stop of water discharge in this embodiment, where FIG. 27A illustrates the power spectrum of the detective signal in the case of only the discharged water flow, and FIG. 27B illustrates the power spectrum of the detective signal in the case where water is being stored in a glass (in the case where the discharged water is being used).

In FIGS. 27A and 27B, two frequency bands of 20 Hz to 30 Hz and 0 to 10 Hz are set as the specific frequency bands in which the comparison is performed. In 20 Hz to 30 Hz, power spectra appear in the case of only the discharged water flow, but few power spectra appear when water is being stored in a glass. Furthermore, in a frequency band of 0 to 10 Hz, power spectra appear in the case of only the discharged water flow, and very large power spectra appear when water is being stored in a glass; and a large value is obtained as the difference value between both detective signals (or both integral values).

The comparison and determination procedure by the control unit 200 is similar to the case of FIGS. 26A and 26B, for example. Two thresholds (the second threshold for a frequency band of 20 Hz to 30 Hz and the first threshold for a frequency band of 0 to 10 Hz) are set in advance for the detective signal in the case of only the discharged water flow; the detective signal of a component in a frequency band of 20 Hz to 30 Hz of the obtained detective signal is compared with the second threshold; and the detective signal of a component in a frequency band of 0 to 10 Hz of the obtained detective signal is compared with the first threshold.

Then, if, for example, the amplitude of the detective signal is below the second threshold in a frequency band of 20 Hz to 30 Hz or the amplitude of the detective signal exceeds the first threshold in a frequency band of 0 to 10 Hz, it is determined that the detective signal is one at the time when the discharged water is being used (being not the detective signal of only the discharged water flow). Furthermore, if the amplitude of the detective signal is not less than the second threshold in a frequency band of 20 Hz to 30 Hz and the amplitude of the detective signal is not more than the first threshold in a frequency band of 0 to 10 Hz, it is determined that the detective signal is that of only the discharged water flow.

Thus, depending on the frequency band, the amplitude of the detective signal at the time when water is being stored in a glass may be larger than the amplitude of the detective signal of only the discharged water flow. That is, in the case of not limiting to a specific frequency band (see FIG. 7), the amplitude of the detective signal of only the discharged water flow is larger than the amplitude of the detective signal at the time when water is being stored in a glass in view of the entire frequency; but in the case of limiting to a specific frequency band via a filter, the amplitude of the detective signal at the time when water is being stored in a glass may be larger than the amplitude of the detective signal of only the discharged water flow. This will now be described with reference to FIG. 28.

Figure 28:
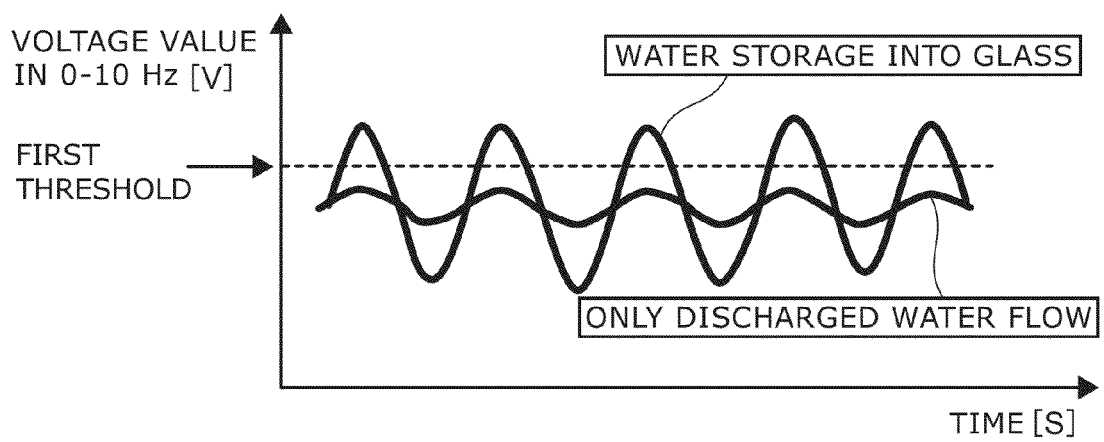
FIG. 28 is a graph illustrating the levels of detective signals obtained from the sensor unit 100 in a frequency band of 0 Hz to 10 Hz.

FIG. 28 is a graph illustrating the levels of detective signals obtained from the sensor unit 100 in a frequency band of 0 Hz to 10 Hz. That is, the vertical axis of the drawing represents the voltage value of the detective signal obtained from the sensor unit 100, and the horizontal axis represents the time.

In the case of limiting to a frequency band of 0 Hz to 10 Hz via a filter, the peak of the power spectrum of the detective signal of only the discharged water flow is about 0.2 as illustrated in FIG. 23A. On the other hand, the peak of the power spectrum of the detective signal at the time when water is being stored in a glass exceeds 0.35 as illustrated in FIG. 23C. This results from the fact that, since water settles down in the glass and the water makes a movement like slow waving as described with reference to FIG. 7, more components are included in a low frequency band when water is being stored in the glass than when there is only the discharged water flow, and peaks look as if they come out large.

Thereby, when focusing on a limited frequency band of 0 Hz to 10 Hz, as illustrated in FIG. 28, the amplitude of the detective signal of only the discharged water flow does not exceed the first threshold, but the amplitude of the detective signal at the time when water is being stored in a glass may exceed the first threshold. That is, the magnitude relation between the amplitude of the detective signal of only the discharged water flow illustrated in FIG. 7 and the amplitude of the detective signal of water storage in a glass illustrated in FIG. 7 may be reversed.

However, in the case of not limiting to a specific frequency band nor using a filter, and even in the case of using a filter, the amplitude of the detective signal of only the discharged water flow is larger than the amplitude of the detective signal at the time when water is being stored in a glass when considering the entire frequency band of, for example, 0 Hz to 100 Hz.

In this way, the difference between the case where the discharged water is being used and the case where it is not being used becomes clear by a comparison using two frequency bands in which the difference between the case of only the discharged water flow and the case where the discharged water is being used is significant; thereby, a more accurate determination can be made. The number of frequency bands in which the comparison is performed is not limited to two but three or more frequency bands may be set.

Furthermore, in this embodiment, a combination is possible of, for example, a method in which a signal in a specific frequency band is extracted from the detective signal obtained from the sensor unit 100 via a filter and the state of the discharged water flow is determined based on the signal, and a method in which the detective signal obtained from the sensor unit 100 is compared with a prescribed threshold without using a filter to determine the state of the discharged water flow. More specifically, a method is given in which: in a high frequency band in which the difference between detective signals obtained from the sensor unit 100 comes out large, a comparison with a prescribed threshold is performed without using a filter to determine the state of the discharged water flow; and on the other hand, in a low frequency band in which the difference between detective signals obtained from the sensor unit 100 comes out small, a signal in a specific frequency band is extracted via a filter and the state of the discharged water flow is determined based on the signal.

Thus, combining the method of determining via a filter and the method of determining without using a filter enables to combine a state in which the stop of water discharge control is desired to be quickly performed and a state in which a clear difference is desired to appear in detective signal. That is, in a high frequency band in which the difference in detective signal comes out large, the determination is performed without using a filter, and therefore the time for passing through a filter (calculating) is not required to enable a quick signal processing. Thus, the control of the stop of water discharge can be performed quickly. On the other hand, in a low frequency band in which the difference in detective signal comes out small, the determination is performed via a filter, and therefore the state of the discharged water flow can be determined with a higher accuracy.

Figure 29:
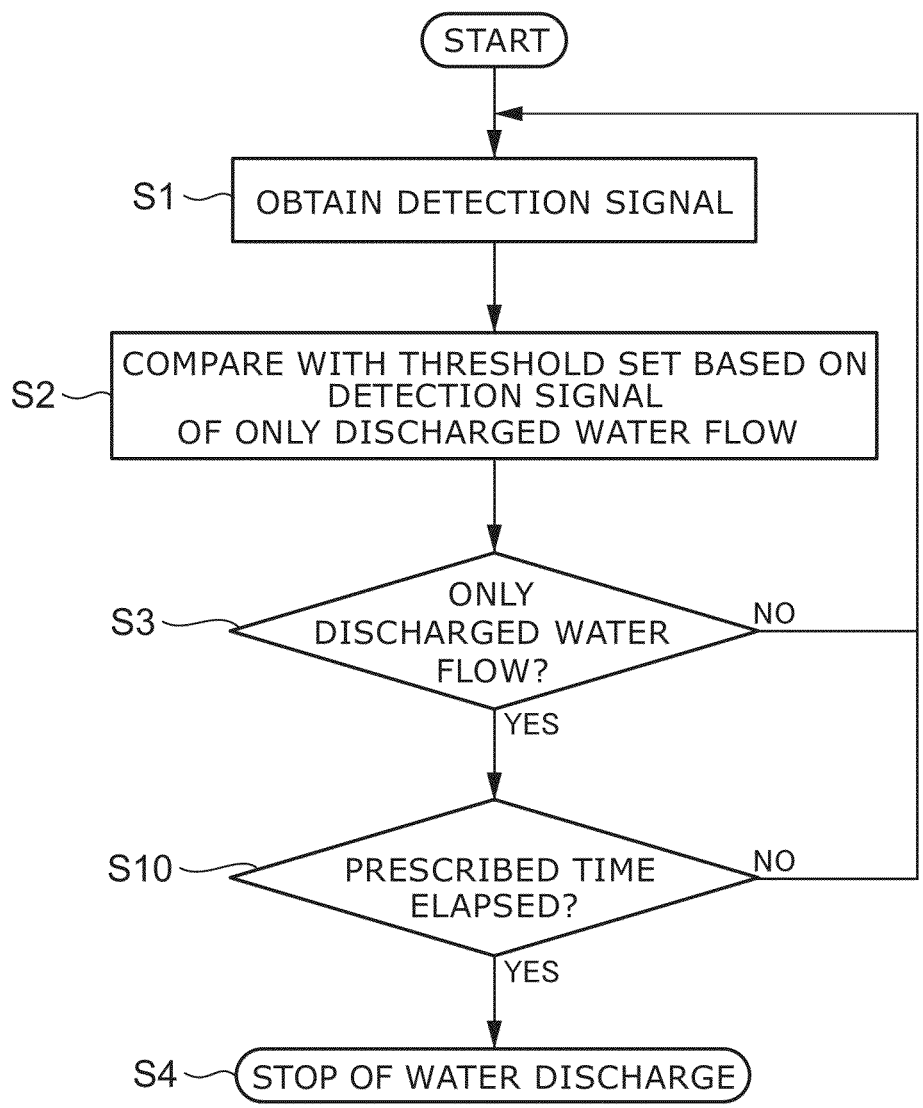
FIG. 29 is a flow chart illustrating the procedure of the control of the stop of water discharge by the control unit 200 in the embodiment of the invention.

FIG. 29 is a flow chart illustrating the procedure of the control of the stop of water discharge by the control unit 200 in this embodiment.

That is, in this specific example, the stop of water discharge is performed when the detective signal of only the discharged water flow continues for a prescribed time. The control unit 200 obtains a detective signal from the sensor unit 100 (step S1), and compares the obtained detective signal mentioned above with the threshold (see FIG. 13A) set based on the detective signal in the case of only the discharged water (step S2). At this time, as described above in regard to FIG. 1A to FIG. 28, the determination is performed by the comparison between the amplitude of the detective signal and the first and second thresholds.

As a result, in the case where it is determined that the detective signal is that of only the discharged water (YES in step S3), whether or not a prescribed time has elapsed since the determination of being the detective signal of only the discharged water is determined by, for example, referring to a timer.

Then, if the prescribed time has not elapsed (NO in step S10), the procedure goes back to step S1 to obtain a detective signal again. On the other hand, if the prescribed time has elapsed (YES in step 510), the valve 250 is closed to perform the stop of water discharge (step S4). In the case where it is determined that the obtained detective signal is different from the detective signal of only the discharged water (NO in step S3), the timer is reset and the procedure goes back to step S1.

As described above, by performing the stop of water discharge when the detective signal of only the discharged water flow continues for the prescribed time, the stop of water discharge in the course of using the discharged water can be prevented more surely. At the same time, the situation in which the detective signal of only the discharged water flow continues for the prescribed time may fall under those cases where the start of water discharge continues although the use has actually finished and there is no user and the like; and performing the stop of water discharge in such a case can prevent the continuation of useless start of water discharge when the discharged water is not being used.

Next, another specific example of the procedure of the control of the stop of water discharge by the control unit 200 in this embodiment will now be described.

In the case where a glass is left as it is at the time of water storage in the glass, in the case where a situation continues in which: a wash bowl is stopped up and water overflows; or the discharged water flow is disordered due to a failure, a breakdown, or the like of the water discharge unit, or in like cases, the detective signal is different from that in the case of only the discharged water flow, but detective signals with an identical pattern may be outputted from the sensor unit 100 continuously. In such cases, since the detective signal at the time when a glass is left as it is or the like is different from the detective signal of only the discharged water flow, there is a case where the stop of water discharge is not performed but the start of water discharge is continued. Accordingly, in this specific example, the stop of water discharge is performed if detective signals with an identical pattern continue for a prescribed time, even if the detective signals are different from the detective signal of only the discharged water.

Figure 30:
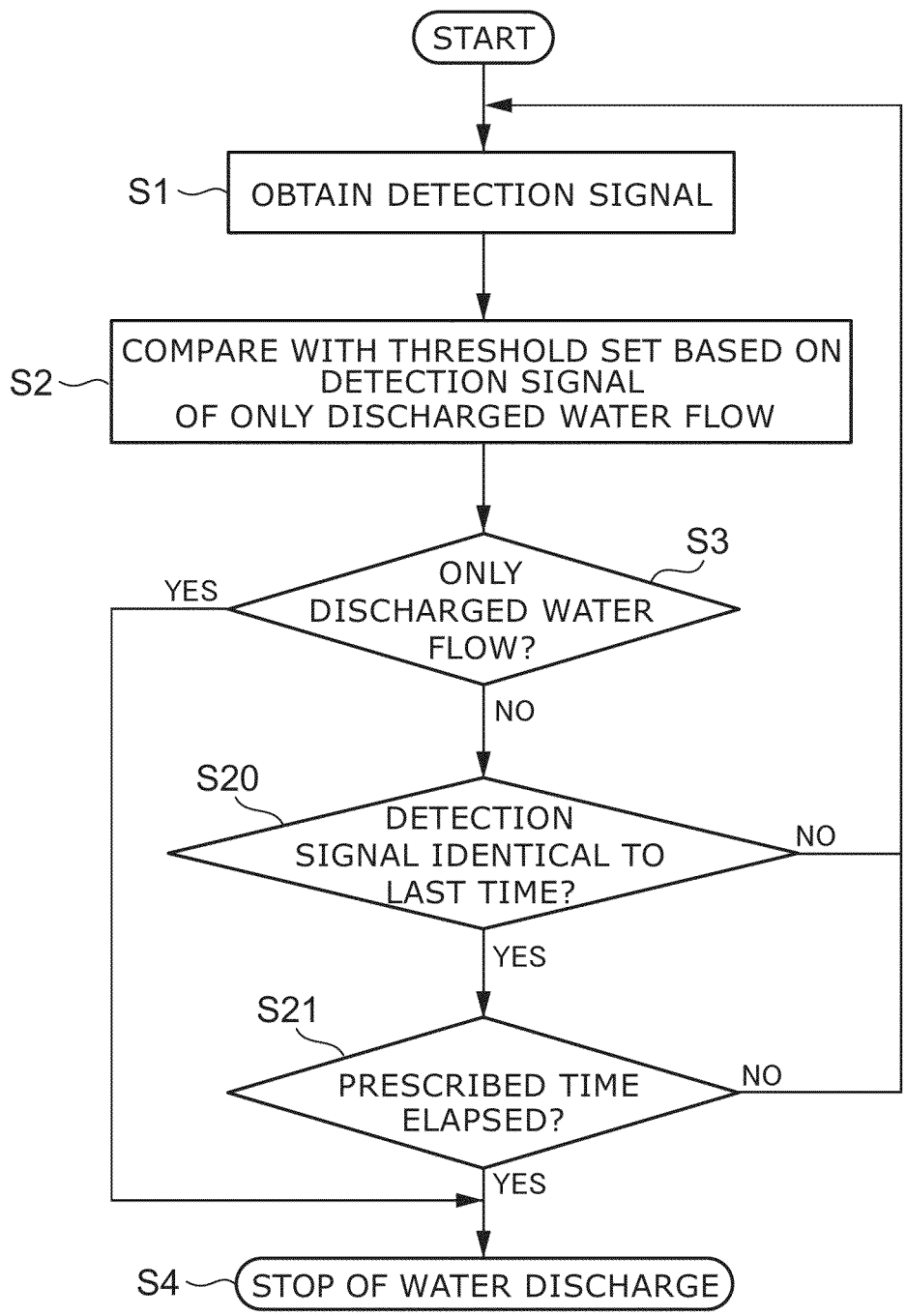
FIG. 30 is a flow chart describing the procedure of the control of the stop of water discharge by the control unit 200 in the embodiment of the invention.

FIG. 30 is a flow chart describing the procedure of the control of the stop of water discharge by the control unit 200 in this specific example. The control unit 200 obtains a detective signal from the sensor unit 100 (step S1), and compares the obtained detective signal mentioned above with a threshold set based on the detective signal in the case of only the discharged water (step S2). At this time, as described above in regard to FIG. 1A to FIG. 28, the determination is performed by the comparison between the amplitude of the detective signal and the first and second thresholds.

In the case where it is determined that the detective signal is that of only the discharged water (YES in step S3), the valve 250 is closed to perform the stop of water discharge (step S4).

On the other hand, in the case where: whether the detective signal is identical in pattern to the detective signal of the last time or not is determined (step S20); and it is determined that both patterns are identical (YES in step S20), whether a prescribed time has elapsed or not is determined with a timer, for example (step S21).

Then, if the prescribed time has elapsed (YES in step S21), the valve 250 is closed to perform the stop of water discharge (step S4); and if the prescribed time has not elapsed (NO in step S21), the procedure goes back to the step S1 mentioned above to obtain a detective signal again. In the case where, in the step S21 mentioned above, it is determined that the detective signal obtained this time is different in pattern from the detective signal obtained last time (NO in step S21), the timer mentioned above is reset and the procedure goes back to the step S1 mentioned above.

As described above, according to this specific example, the stop of water discharge is performed if detective signals different from the detective signal of only the discharged water flow continue with an identical pattern for the prescribed time; thereby, the continuation of useless start of water discharge can be prevented.

Figure 31:
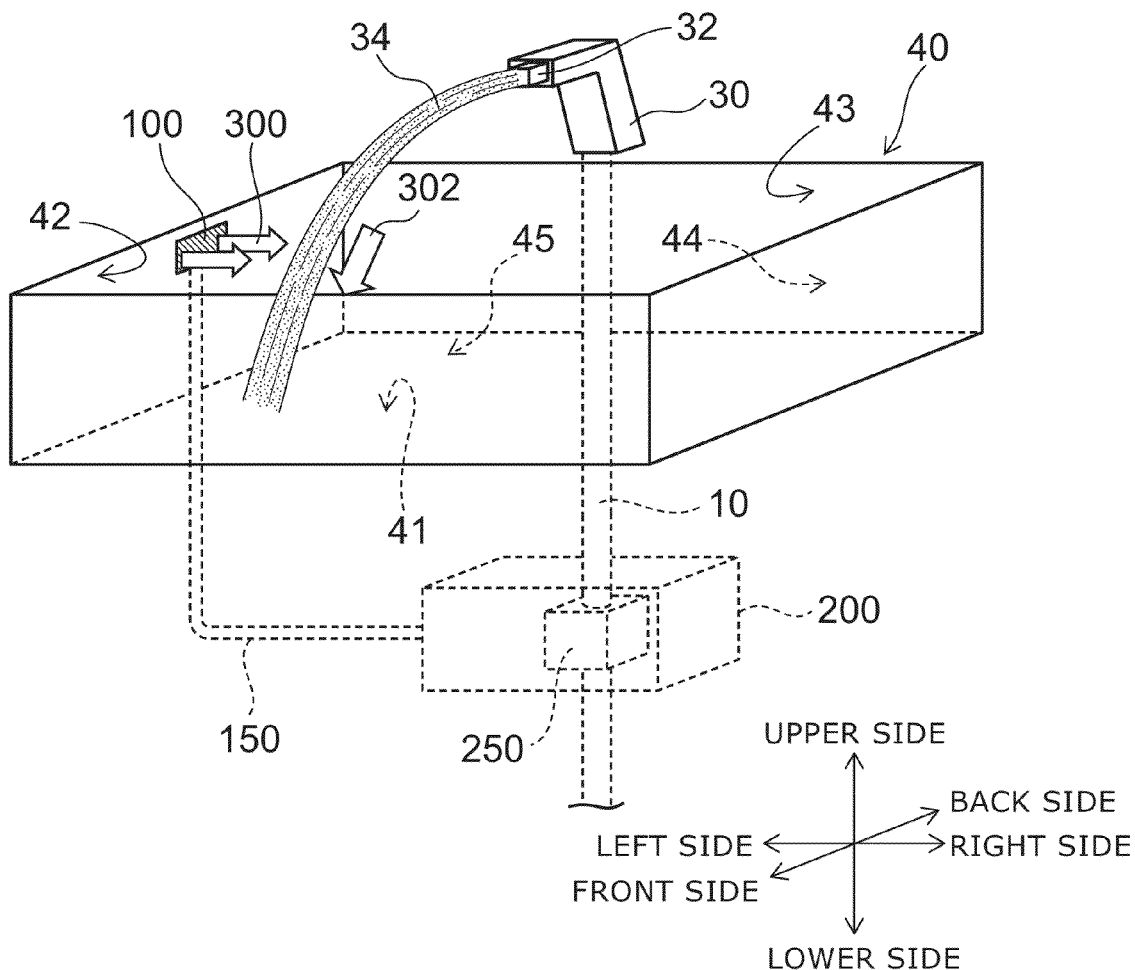
FIG. 31 is a schematic view illustrating another second specific example of the water discharge system of the embodiment of the invention.

FIG. 31 is a schematic view illustrating another second specific example of the water discharge system of this embodiment.

Also the faucet apparatus of this embodiment includes the sensor unit 100, the control unit 200, the water discharge unit 30, and the water receiving unit 40.

The water receiving unit 40 includes a water receiving face 41 on which a discharged water flow 34 lands. The water receiving unit 40 further includes a left side face 42, a back face 43, a right side face 44, and a front face 45 provided around the water receiving face 41. The discharged water flow 34 discharged from a spout 32 lands in a direction oblique to the water receiving face 41 as illustrated by an arrow (flow direction) 302. However, the configuration is not limited to this, but water may land in a direction substantially perpendicular to the water receiving face 41, for example.

The sensor unit 100 is provided on the back side of the left side face 42 of the water receiving unit 40. The sensor unit 100 radiates a radio wave to the discharged water flow 34 from a direction substantially orthogonal to the flow direction 302 of the discharged water flow 43 as illustrated by an arrow (maximum orientation) 300. The radiated radio wave is reflected by the discharged water flow 34, and the sensor unit 100 receives the reflected radio wave (reflected wave). Furthermore, the sensor unit 100 transmits the reflected wave to the control unit 200 as the information of an object to be detected.

Since the sensor unit 100 is provided on the back side of the left side face 42, the water receiving unit 40 is preferably made of, for example, a resin so that the radio wave from the sensor unit 100 may be readily radiated toward the discharged water flow 34. Even if the water receiving unit is made of a metal and a ceramic material, a not-illustrated window or the like is preferably provided at least in a portion covering the front face of the sensor unit 100.

According to this specific example, the radio wave from the sensor unit 100 can be readily radiated in a direction orthogonal to the discharged water flow 34. For example, even in those cases where the water force of the discharged water flow 34 discharged from the spout 30 changes, a radio wave can be radiated in a direction orthogonal to the discharged water flow by radiating the radio wave from the side. Consequently, as described above in regard to FIG. 4 and FIG. 5, the level of the detective signal in the state of only the discharged water flow (corresponding to FIG. 6A) can be suppressed, and this allows to enlarge the difference with the detective signal in the state in which the discharged water flow is disordered in contact with a hand or the like. Thus, a more stable and sure detection becomes possible.

Figure 32:
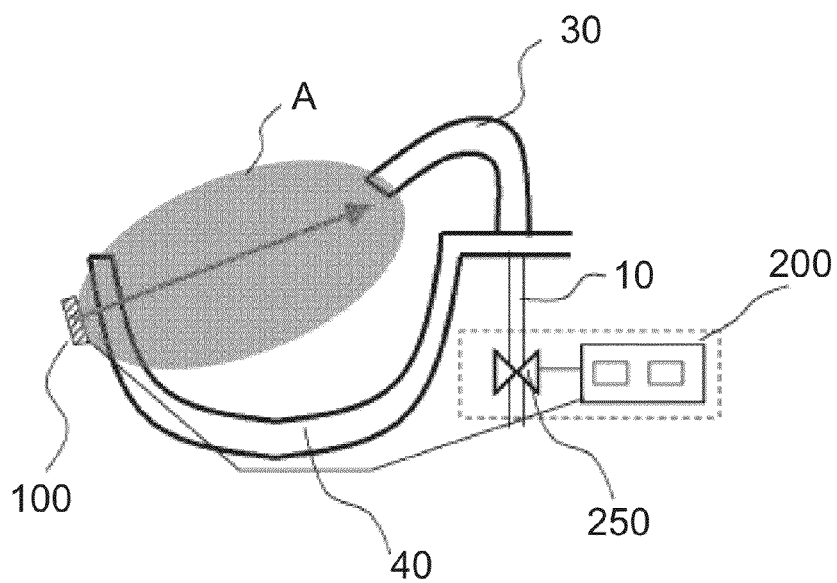
FIG. 32 is a schematic view illustrating a third specific example of the water discharge system of the embodiment of the invention.

FIG. 32 is a schematic view illustrating a third specific example of the water discharge system of this embodiment. According to the third specific example, the sensor 100 is installed on the user side of the water receiving unit and radiates a radio wave toward the spout 30. Such a configuration allows to positively detect the signal of only the discharged water flow. In this case, since the discharged water flow is released toward the sensor 100, the frequency of the signal detected by the sensor 100 is higher than that in such cases as FIGS. 1A and 1B where the discharged water flow goes across the sensor. Increasing the frequency of the signal to be detected facilitates the distinction from frequencies that are detected due to the action of hand-washing or water storage in a glass.

Furthermore, radiating a radio wave toward the spout 30 prevents a mistaken detection in the face of the user's action of passing in front of the water receiving unit, and user's actions other than the washing action such as gargling and adjusting his personal appearance in front of the water receiving unit.

Figure 33:
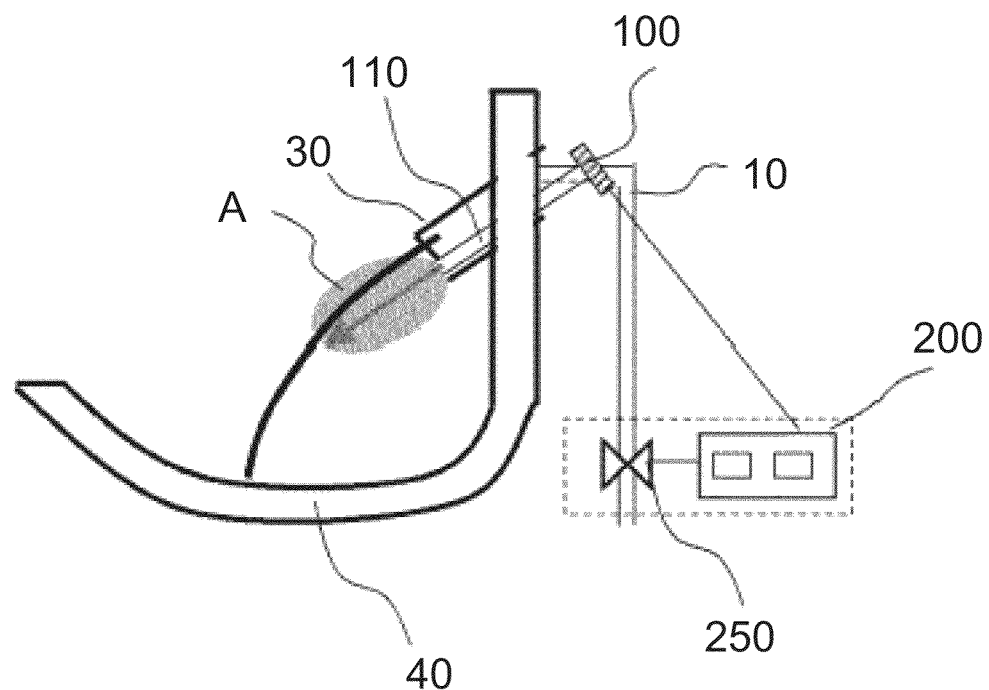
FIG. 33 is a schematic view illustrating a fourth specific example of the water discharge system of the embodiment of the invention.

FIG. 33 is a schematic view illustrating a fourth specific example of the water discharge system of this embodiment. The fourth specific example has a configuration in which a waveguide that transmits the radio wave radiated from the sensor 100 is installed near the exit of a feed-water inlet hose or a spout. The sensor 100 and one end of the waveguide 110 are connected by a connection member, and the other end on the spout side is configured to be opened so that a radio wave may be radiated from the opening face. Such a configuration allows not only to detect the discharged water flow, but also to reduce the number of mistaken detections in the face of actions in front of the water receiving unit because only a region near the spout can be detected.

Figure 34:
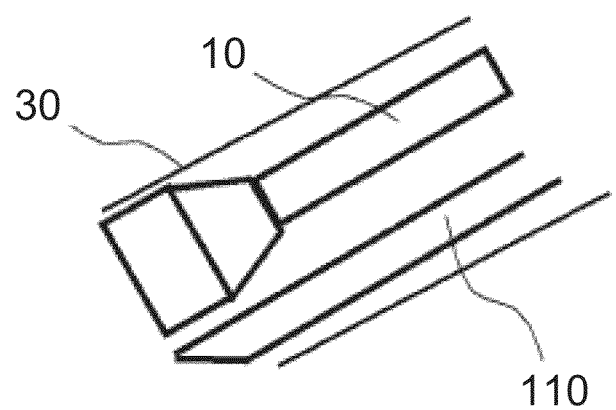
FIG. 34 is a schematic view illustrating the enlarged region near the spout in the fourth specific example of the water discharge system of the embodiment of the invention.

The waveguide is more preferably installed below the spout as illustrated in FIG. 34. Thereby, when the discharged water flow is discharged, the progress of the radio wave is impeded by the discharged water flow with a high relative permittivity, and the orientation changes to the water receiving unit side. This allows to detect the motion of hand-washing and the state of scattered water more clearly. Furthermore, as illustrated in FIG. 34, the direction of the maximum radiation electric power can be changed to control the orientation also by cutting the opening face of the waveguide 110 with an angle. The waveguide may be made of a resin plated with an electrically conductive material, or a metallic material.

Hereinabove, embodiments of the invention are described with reference to the drawings. However, the invention is not limited to these embodiments. One skilled in the art may perform design modifications on the configuration and disposition of the sensor unit, the procedure of the comparison of the detective signal and the determination of the stop of water discharge procedure at the control unit, and the like; such design modifications are included in the scope of the invention to the extent that they do not deviate from the spirit of the invention.

What is claimed is:

1. A water discharge system comprising:
    a water discharge unit;
    a sensor unit configured to obtain a detective signal about a movement of an object to be detected through a reflected wave of a radiated radio wave;
    a control unit configured to control the start of water discharge from the water discharge unit based on the detective signal from the sensor unit; and
    a storage mechanics configured to store a threshold, the threshold being a determination value for controlling the start of water discharge from the water discharge unit by the control unit,
    the sensor unit being installed so that at least part of a radiated radio wave comes into contact with a discharged water flow discharged from the water discharge unit and configured to receive the reflected wave reflected by the discharged water flow,
    the control unit having a determination unit, the determination unit determining whether the discharged water is in a disordered state or in a state in which only the start of water discharge is performed by checking a relationship between the threshold set larger than amplitude of the detective signal in a water flow state in which only the start of water discharge from the water discharge unit is performed and amplitude of the detective signal received by the sensor unit, and
    the control unit being configured to continue the start of water discharge in case where the determination unit determines that the discharged water is in the disordered state and to stop the start of water discharge in case where the determination unit determines that the discharged water is in a state in which only the start of water discharge is performed.

2. The water discharge system according to claim 1, wherein the control unit stops water discharge from the water discharge unit when a state in which the amplitude of the detective signal received by the sensor unit is below the threshold continues for a first prescribed time.

3. The water discharge system according to claim 1, wherein the control unit stops water discharge from the water discharge unit when the amplitude of the detective signal received by the sensor unit changes from a state of being larger than the threshold to a state of being smaller than the threshold.

4. The water discharge system according to claim 1, wherein the control unit stops water discharge from the water discharge unit when the amplitude of the detective signal received by the sensor unit changes from a state of being larger than the threshold to a state of being smaller than the threshold and a state of being below the threshold continues for a second prescribed time.

5. The water discharge system according to claim 1, wherein the threshold is determined in advance and stored in the storage mechanics.

6. The water discharge system according to claim 1, wherein the control unit determines the threshold based on a signal obtained from a water flow state in which only the start of water discharge from the water discharge unit is performed and stores the threshold in the storage mechanics.

7. The water discharge system according to claim 6, wherein the control unit performs determination and storage of the threshold at intervals of a prescribed time.

8. The water discharge system according to claim 6, wherein the control unit performs determination and storage of the threshold at a time when a user uses the water discharge system relatively less frequently.

9. The water discharge system according to claim 6, wherein the control unit performs determination and storage of the threshold after at least one of the start of water discharge from a water discharge unit and the stop of water discharge is performed prescribed times.

10. The water discharge system according to claim 1, wherein
    the threshold is set in a first frequency band and
    the control unit performs the determination in the first frequency band.

11. The water discharge system according to claim 1, wherein
    the threshold is set in both a first frequency band and a second frequency band different from the first frequency band and
    the control unit performs the determination in the first and second frequency bands.

12. The water discharge system according to claim 1, wherein the control unit stops water discharge from the water discharge unit when a state in which the start of water discharge from the water discharge unit is continued lasts for over a prescribed time.

13. The water discharge system according to claim 1, wherein the detective signal includes a Doppler component in which velocity of an object to be detected is reflected.

14. A water discharge system comprising:
    a water discharge unit;
    a sensor unit configured to obtain a detective signal about a movement of an object to be detected through a reflected wave of a radiated radio wave;
    a control unit configured to control the start of water discharge from the water discharge unit based on the detective signal from the sensor unit; and
    a storage mechanics configured to store a threshold, the threshold being a determination value for controlling the start of water discharge from the water discharge unit by the control unit,
    the sensor unit being installed so that at least part of a radiated radio wave comes into contact with a discharged water flow discharged from the water discharge unit and configured to receive the reflected wave reflected by the discharged water flow,
    the control unit having a determination unit, the determination unit determining whether the discharged water is in a state of being stored in a glass or in a state in which only the start of water discharge is performed by checking a relationship between the threshold set smaller than amplitude of the detective signal in a water flow state in which only the start of water discharge form the water discharge unit is performed and amplitude of the detective signal received by the sensor unit, and
    the control unit being configured to continue the start of water discharge in case where the determination unit determines that the discharged water is in a state of being stored in a glass and to stop the start of water discharge in case where the determination unit determines that the discharged water is in a state in which only the start of water discharge is performed.

15. The water discharge system according to claim 14, wherein the control unit stops water discharge from the water discharge unit when a state in which the amplitude of the detective signal received by the sensor unit is over the threshold continues for a third prescribed time.

16. The water discharge system according to claim 14, wherein the control unit stops water discharge from the water discharge unit when the amplitude of the detective signal received by the sensor unit changes from a state of being smaller than the threshold to a state of being larger than the threshold.

17. The water discharge system according to claim 14, wherein the control unit stops water discharge from the water discharge unit when the amplitude of the detective signal received by the sensor unit changes from a state of being smaller than the threshold to a state of being larger than the threshold and a state of being over the threshold continues for a fourth prescribed time.

18. The water discharge system according to claim 14, wherein the threshold is determined in advance and stored in the storage mechanics.

19. The water discharge system according to claim 14, wherein the control unit determines the threshold based on a signal obtained from a water flow state in which only the start of water discharge from the water discharge unit is performed and stores the threshold in the storage mechanics.

20. The water discharge system according to claim 19, wherein the control unit performs determination and storage of the threshold at intervals of a prescribed time.

21. The water discharge system according to claim 19, wherein the control unit performs determination and storage of the threshold at a time when a user uses the water discharge system relatively less frequently.

22. The water discharge system according to claim 19, wherein the control unit performs determination and storage of the threshold after at least one of the start of water discharge from a water discharge unit and the stop of water discharge is performed prescribed times.

23. The water discharge system according to claim 14, wherein
the threshold is set in a first frequency band and
the control unit performs the determination in the first frequency band.

24. The water discharge system according to claim 14, wherein
the threshold is set in both a first frequency band and a second frequency band different from the first frequency band and
the control unit performs the determination in the first and second frequency bands.

25. The water discharge system according to claim 14, wherein the control unit stops water discharge from the water discharge unit when a state in which the start of water discharge from the water discharge unit is continued lasts for over a prescribed time.

26. The water discharge system according to claim 14, wherein the detective signal includes a Doppler component in which velocity of an object to be detected is reflected.

27. A water discharge system comprising:
a water discharge unit;
a sensor unit configured to obtain a detective signal about a movement of an object to be detected through a reflected wave of a radiated radio wave;
a control unit configured to control the start of water discharge from the water discharge unit based on the detective signal from the sensor unit; and
a storage mechanics configured to store a first threshold and a second threshold, the first threshold being a determination value for controlling the start of water discharge from the water discharge unit by the control unit, the second threshold being a determination value for controlling the start of water discharge from the water discharge unit by the control unit,
the sensor unit being installed so that at least part of a radiated radio wave comes into contact with a discharged water flow discharged from the water discharge unit and configured to receive the reflected wave reflected by the discharged water flow,
the control unit having a determination unit, the determination unit determining whether the discharged water is in a disordered state or in a state of being stored in a glass or in a state in which only the start of water discharge is performed by checking a relationship between the first threshold set larger than amplitude of the detective signal in a water flow state in which only the start of water discharge from the water discharge unit is performed and the second threshold set smaller than the amplitude, and amplitude of the detective signal received by the sensor unit, and
the control unit being configured to continue the start of water discharge in case where the determination unit determines that the discharged water is in the disordered state and in a state of being stored in a glass, and to stop the start of water discharge in case where the determination unit determines that the discharged water is in a state in which only the start of water discharge is performed.

28. The water discharge system according to claim 27, wherein the control unit stops water discharge from the water discharge unit when the amplitude of the detective signal received by the sensor unit changes from a state of being larger than the first threshold to a state of being between the first threshold and the second threshold and a state of being between the first threshold and the second threshold continues for a fifth prescribed time.

29. The water discharge system according to claim 27, wherein the control unit stops water discharge from the water discharge unit when the amplitude of the detective signal received by the sensor unit changes from a state of being smaller than the second threshold to a state of being between the first threshold and the second threshold and a state of being between the first threshold and the second threshold continues for a fifth prescribed time.

* * * * *

UNITED STATES PATENT AND TRADEMARK OFFICE
CERTIFICATE OF CORRECTION

PATENT NO.        : 8,612,057 B2
APPLICATION NO.   : 12/809251
DATED             : December 17, 2013
INVENTOR(S)       : Kensuke Murata et al.

Page 1 of 1

It is certified that error appears in the above-identified patent and that said Letters Patent is hereby corrected as shown below:

In the Specification

Column 22, line 27, please replace "510" with - S10 -

Signed and Sealed this
Twenty-fifth Day of March, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,612,057 B2                                                Page 1 of 1
APPLICATION NO. : 12/809251
DATED            : December 17, 2013
INVENTOR(S)      : Murata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this
Twenty-second Day of September, 2015

Michelle K. Lee
*Director of the United States Patent and Trademark Office*